(12) United States Patent
Jamison et al.

(10) Patent No.: US 11,012,445 B1
(45) Date of Patent: May 18, 2021

(54) METHODS AND APPARATUSES FOR MANAGING EXTERNAL APPROVAL PROVISIONING AND EXTERNAL MESSAGING COMMUNICATION REQUESTS IN A GROUP-BASED COMMUNICATION SYSTEM

(71) Applicant: Slack Technologies, Inc., San Francisco, CA (US)

(72) Inventors: Britton Jamison, San Francisco, CA (US); Smruthi Venkatesh, San Francisco, CA (US); James Barnes, San Francisco, CA (US); Ryan Morris, Alameda, CA (US)

(73) Assignee: Slack Technologies, Inc., San Francisco, CA (US)

( * ) Notice: Subject to any disclaimer, the term of this patent is extended or adjusted under 35 U.S.C. 154(b) by 0 days.

(21) Appl. No.: 16/825,527

(22) Filed: Mar. 20, 2020

Related U.S. Application Data

(63) Continuation of application No. 16/821,514, filed on Mar. 17, 2020.

(51) Int. Cl.
  *H04L 29/06* (2006.01)
  *H04L 9/32* (2006.01)
  *H04L 29/08* (2006.01)

(52) U.S. Cl.
  CPC ............ *H04L 63/102* (2013.01); *H04L 9/321* (2013.01); *H04L 29/08621* (2013.01); *H04L 63/104* (2013.01); *H04L 65/1066* (2013.01)

(58) Field of Classification Search
  CPC . H04L 9/321; H04L 29/08621; H04L 63/102; H04L 63/104; H04L 65/1066
  See application file for complete search history.

(56) References Cited

U.S. PATENT DOCUMENTS

| | | | |
|---|---|---|---|
| 9,129,125 B2 * | 9/2015 | Wang | G06F 21/6209 |
| 9,799,082 B1 * | 10/2017 | Raskin | G06F 16/9535 |
| 10,230,731 B2 * | 3/2019 | Weaver | G06Q 10/101 |

(Continued)

OTHER PUBLICATIONS

"Die, Email, Die! A Flickr Cofounder Aims to Cut Us All Some Slack", Readwriteweb, LexisNexis, https://advance.lexis.com/api/permalink/33dd79e2-90f5-409d-ae27-5a2c7e86bf31/?context=1000516>. (dated Aug. 14, 2013, 4:15 PM) 2 pages.

(Continued)

*Primary Examiner* — George C Neurauter, Jr.
(74) *Attorney, Agent, or Firm* — Erise IP, P.A.

(57) ABSTRACT

Various embodiments of the present disclosure are directed to a group-based communication system that is configured to more efficiently manage resource sharing requests. In particular, in some embodiments, the group-based communication system is configured to enable admin users to use an external service, such as an external approval provisioning service, that is separate and distinct from the group-based communication system to manage group-based communication resource sharing requests. In other embodiments, the group-based communication system is configured to allow communication with external users and to trigger new user onboarding protocols through the ingestion of external user directories associated with a sponsor user.

25 Claims, 13 Drawing Sheets

(56) References Cited

U.S. PATENT DOCUMENTS

| | | | | |
|---|---|---|---|---|
| 2013/0311598 | A1* | 11/2013 | Arrouye | H04L 67/1097 709/217 |
| 2016/0330208 | A1* | 11/2016 | Chao | G06Q 10/101 |
| 2018/0287982 | A1 | 10/2018 | Draeger et al. | |
| 2019/0026298 | A1* | 1/2019 | Jin | H04L 67/1097 |
| 2019/0028287 | A1* | 1/2019 | Jin | H04L 12/1822 |
| 2019/0372926 | A1 | 12/2019 | Elliott | |
| 2020/0364666 | A1* | 11/2020 | Nam | G06F 21/6254 |

OTHER PUBLICATIONS

"How Slack changed the way we work by pulling the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.

Adrienne LaFrance, "The Triumph of Email", Atlantic Online, LexisNexis, https://advance.lexis.com/api/permalink/32d7ddd9-d4c1-4a73-86f7-08ab5842fde6/?context=1000516, (dated Jan. 6, 2016) 5 pages.

David Auerbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.

Ernie Smith, "Picking Up the Slack", TEDIUM, [online][retrieved May 9, 2019]. Retrieved from the Internet: <URL: https://tedium.co/2017/10/17/irc-vs-slack-chat-history/>. (dated Oct. 17, 2017) 8 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 17 pages.

Jonathan Vanian, "Why these startups think chat apps are the next big thing in workplace collaboration", GIGAOM, LexisNexis, https://advance.lexis.com/api/permalink/e83778c8-09c8-43aa-9ba0-88526283de69/?context=1000516, (dated Aug. 1, 2014, 5:45 PM) 4 pages.

Matsumoto, T. et al., "Chocoa Communicator—A New Communication System Based on Awareness and Text Communications—", Fujitsu Sci. Tech. J., 36, 2, (Dec. 2000) 154-161.

Matthew Ingram, "Flickr co-founder launches Slack, an all-in-one messaging tool designed to kill email forever", GIGAOM, LexisNexis, https://advance.lexis.com/api/permalink/0b676b7c-aec3-4560-861e-d030d1dd008c/?context=1000516, (dated Feb. 12, 2014, 7:03 PM), 2 pages.

Michael Carney, "Slack is thriving on a cocktail of whimsy and great timing", Pandodaily, LexisNexis, https://advance.lexis.com/api/permalink/dd2d4ee5-2ddf-4d3a-a1d9-3bcee5e38b74/?context=1000516, (dated Feb. 6, 2015, 2:12 AM) 3 pages.

Mike Issac, "Slack, a Start-Up With an App to Foster Business Collaboration, Is Valued at $1.1 Billion", The New York Times Blogs (BITS), LexisNexis, https://advance.lexis.com/api/permalink/3eb84b34-a8f9-4d7d-9573-89d9598a4963/?context=1000516>. (dated Oct. 31, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 66 pages.

Rebecca Walberg, "Email biggest office waste of time: survey", National Post, At FP10, LexisNexis, https://advance.lexis.com/api/permalink/96268e3f-26ad-48ac-a98f-6c39804ebded/?context=1000516, (dated Mar. 4, 2014) 2 pages.

Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

PCT/US20/58356 International Search Report and Written Opinion dated Feb. 1, 2021.

* cited by examiner

METHODS AND APPARATUSES FOR MANAGING EXTERNAL APPROVAL PROVISIONING AND EXTERNAL MESSAGING COMMUNICATION REQUESTS IN A GROUP-BASED COMMUNICATION SYSTEM

CROSS-REFERENCE TO RELATED APPLICATIONS

This application is a continuation of and claims priority to U.S. Non-Provisional application Ser. No. 16/812,514, entitled "METHODS AND APPARATUSES FOR MANAGING EXTERNAL APPROVAL PROVISIONING AND EXTERNAL MESSAGING COMMUNICATION REQUESTS IN A GROUP-BASED COMMUNICATION SYSTEM," and filed Mar. 17, 2020, the entirety of which is hereby incorporated by reference.

BACKGROUND

Applicant has identified a number of deficiencies and problems associated with existing methods, apparatus, and systems related to external user approvals and invite requests made in connection with messaging or communication systems. Through applied effort, ingenuity, and innovation, many of these identified deficiencies and problems have been solved by developing solutions that are structured in accordance with the embodiments of the present disclosure, many examples of which are described in detail herein.

BRIEF SUMMARY

One embodiment is directed to an apparatus comprising at least one processor and at least one non-transitory memory including program code, the at least one non-transitory memory and the program code configured to, with the at least one processor, cause the apparatus to, in response to receiving, from a first client device associated with a sending user identifier, a resource sharing interface request, generate an authorization request based at least in part on the resource sharing interface request, wherein the authorization request comprises a group-based communication resource identifier and a recipient entity identifier. The at least one non-transitory memory and the program code are further configured to, with the at least one processor, cause the apparatus to cause transmission of the authorization request to an external approval provisioning service. The at least one non-transitory memory and the program code are further configured to, with the at least one processor, cause the apparatus to receive, in response to the authorization request, a resource sharing response event from the external approval provisioning service. The at least one non-transitory memory and the program code are further configured to, with the at least one processor, cause the apparatus to, in accordance with a determination that an authorization condition is met based on the resource sharing response event, grant access to a group-based communication resource associated with the group-based communication resource identifier for a recipient user associated with the recipient entity identifier based on the resource sharing response event. The at least one non-transitory memory and the program code are further configured to, with the at least one processor, cause the apparatus to update a sharing approval repository to add a sharing approval indication associated with the recipient entity identifier and the group-based communication resource identifier based on the resource sharing response event.

In some embodiments, the at least one non-transitory memory and the program code are configured to, with the at least one processor, cause the apparatus to, in accordance with a determination that an authorization condition is not met based on the resource sharing response event, deny access to a group-based communication resource associated with the group-based communication resource identifier for a recipient user associated with the recipient entity identifier based on the resource sharing response event, and update a sharing approval repository to add a sharing denial indication associated with the recipient entity identifier and the group-based communication resource identifier based on the resource sharing response event.

In some embodiments, the at least one non-transitory memory and the program code are further configured to, with the at least one processor, cause the apparatus to, in an instance in which the sharing approval repository is updated to add the sharing denial indication, cause transmission of a denial notification to the first client device, wherein the denial notification is associated with the group-based communication resource identifier and the recipient entity identifier. In some embodiments, the at least one non-transitory memory and the program code are configured to, with the at least one processor, cause the apparatus to cause transmission of a shared resource invite request to at least one second client device that is associated with the recipient entity identifier and, in response to receiving an authorization confirmation associated with the shared resource invite request from the at least one second client device, update the sharing approval repository to add a sharing approval indication associated with the recipient entity identifier and the group-based communication resource identifier.

In some embodiments of the apparatus, the external approval provisioning service is an identity provisioning service. In some embodiments of the apparatus, the group-based communication resource identifier is associated with a group-based communication channel. In some embodiments of the apparatus, the group-based communication resource identifier is associated with a group-based communication workspace. In some embodiments of the apparatus, the group-based communication resource identifier is associated with a group-based communication file. In some embodiments of the apparatus, wherein the recipient entity identifier comprises a recipient user identifier associated with the recipient user. In some embodiments of the apparatus, the recipient entity identifier comprises a recipient organization identifier associated with the recipient user. In some embodiments of the apparatus, the authorization request further comprises a request type identifier that corresponds to one of a single resource request, a multi-resource request, a guest access request, or a full member request.

Another embodiment is directed to a computer program product comprising at least one non-transitory computer-readable storage medium having computer-readable program code portions stored therein, the computer-readable program code portions comprising an executable portion configured to, in response to receiving, from a first client device associated with a sending user identifier, a resource sharing interface request, generate an authorization request based at least in part on the resource sharing interface request, the authorization request comprising a group-based communication resource identifier and a recipient entity identifier. The computer-readable program code portions comprising the executable portion are further configured to cause transmission of the authorization request to an external approval provisioning service. The computer-readable program code portions comprising the executable portion are further configured to receive, in response to the authorization request, a resource sharing response event from the external approval provisioning service. The computer-readable program code portions comprising the executable portion are further configured to, in accordance with a determination that an authorization condition is met based on the resource sharing response event, grant access to a group-based communication resource associated with the group-based communication resource identifier for a recipient user associated with the recipient entity identifier based on the resource sharing response event. The computer-readable program code portions comprising the executable portion are further configured to update a sharing approval repository to add a sharing approval indication associated with the recipient entity identifier and the group-based communication resource identifier based on the resource sharing response event.

In some embodiments, the computer-readable program code portions comprising the executable portion are configured to further, in accordance with a determination that an authorization condition is not met based on the resource sharing response event, deny access to a group-based communication resource associated with the group-based communication resource identifier for a recipient user associated with the recipient entity identifier based on the resource sharing response event, and update a sharing approval repository to add a sharing denial indication associated with the recipient entity identifier and the group-based communication resource identifier based on the resource sharing response event.

In some embodiments, the computer-readable program code portions comprising the executable portion are configured to further, in an instance in which the sharing approval repository is updated to add the sharing denial indication, cause transmission of a denial notification to the first client device, wherein the denial notification is associated with the group-based communication resource identifier and the recipient entity identifier. In some embodiments, the computer-readable program code portions comprising the executable portion are configured to further cause transmission of a shared resource invite request to at least one second client device that is associated with the recipient entity identifier, and, in response to receiving an authorization confirmation associated with the shared resource invite request from the at least one second client device, update the sharing approval repository to add a sharing approval indication associated with the recipient entity identifier and the group-based communication resource identifier.

In some embodiments of the computer program product, the external approval provisioning service is an identity provisioning service. In some embodiments of the computer program product, the group-based communication resource identifier is associated with a group-based communication channel. In some embodiments of the computer program product, the group-based communication resource identifier is associated with a group-based communication workspace. In some embodiments of the computer program product, the group-based communication resource identifier is associated with a group-based communication file. In some embodiments of the computer program product, the recipient entity identifier comprises a recipient user identifier associated with the recipient user. In some embodiments of the computer program product, wherein the recipient entity identifier comprises a recipient organization identifier associated with the recipient user. In some embodiments of the computer program product, the authorization request further comprises a request type identifier that corresponds to one of a single resource request, a multi-resource request, a guest access request, or a full member request.

Another embodiment is directed to a method comprising, in response to receiving, from a first client device associated with a sending user identifier, a resource sharing interface request, generating an authorization request based at least in part on the resource sharing interface request, wherein the authorization request comprises a group-based communication resource identifier and a recipient entity identifier. The method further comprises causing transmission of the authorization request to an external approval provisioning service. The method further comprises receiving, in response to the authorization request, a resource sharing response event from the external approval provisioning service. The method further comprises, in accordance with a determination that an authorization condition is met based on the resource sharing response event, granting access to a group-based communication resource associated with the group-based communication resource identifier for a recipient user associated with the recipient entity identifier based on the resource sharing response event. The method further comprises updating a sharing approval repository to add a sharing approval indication associated with the recipient entity identifier and the group-based communication resource identifier based on the resource sharing response event.

In some embodiments, the method further comprises, in accordance with a determination that an authorization condition is not met based on the resource sharing response event, denying access to a group-based communication resource associated with the group-based communication resource identifier for a recipient user associated with the recipient entity identifier based on the resource sharing response event, and updating a sharing approval repository to add a sharing denial indication associated with the recipient entity identifier and the group-based communication resource identifier based on the resource sharing response event. In some embodiments, the method further comprises, in an instance in which the sharing approval repository is updated to add the sharing denial indication, causing transmission of a denial notification to the first client device, wherein the denial notification is associated with the group-based communication resource identifier and the recipient entity identifier. In some embodiments, the method further comprises causing transmission of a shared resource invite request to at least one second client device that is associated with the recipient entity identifier; and, in response to receiving an authorization confirmation associated with the shared resource invite request from the at least one second client device, updating the sharing approval repository to add a sharing approval indication associated with the recipient entity identifier and the group-based communication resource identifier.

In some embodiments of the method, the external approval provisioning service is an identity provisioning service. In some embodiments of the method, the group-based communication resource identifier is associated with a group-based communication channel. In some embodiments of the method, the group-based communication resource identifier is associated with a group-based communication workspace. In some embodiments of the method, the group-based communication resource identifier is associated with a group-based communication file. In some embodiments of the method, the recipient entity identifier comprises a recipient user identifier associated with the recipient user. In some embodiments of the method, the recipient entity identifier comprises a recipient organization identifier associated with the recipient user. In some embodiments of the method, the authorization request further comprises a request type identifier that corresponds to one of a single resource request, a multi-resource request, a guest access request, or a full member request. One embodiment is directed to an apparatus comprising at least one processor and at least one non-transitory memory including program code, the at least one non-transitory memory and the program code configured to, with the at least one processor, cause the apparatus to, in response to receiving an external user directory corpus associated with a sponsor user identifier and a group-based communication workspace identifier, store the external user directory corpus in association with the sponsor user identifier and the group-based communication workspace identifier. The at least one non-transitory memory and the program code are further configured to, with the at least one processor, cause the apparatus to receive a messaging communication transmission request from a sending user client device associated with the group-based communication workspace identifier, the messaging communication transmission request comprising message data and an external user identifier selected from the external user directory corpus. The at least one non-transitory memory and the program code are further configured to, with the at least one processor, cause the apparatus to cause transmission of the message data to an external messaging resource address associated with the external user identifier for display by an external messaging resource as a linked message object.

In some embodiments, the at least one non-transitory memory and the program code are further configured to, with the at least one processor, cause the apparatus to, prior to receiving the messaging communication transmission request, receive a recipient identifier from the sending user client device associated with the group-based communication workspace identifier, query a user directory including the external user directory corpus based on the recipient identifier, generate a suggested recipient user identifier set drawn at least in part from the external user directory corpus based on the recipient identifier, and cause display of the suggested recipient user identifier set to the sending user client device, the messaging communication transmission request further indicating selection of the external user identifier from the suggested recipient user identifier set.

In some embodiments of the apparatus, the messaging communication transmission request is generated in response to user engagement of a direct messaging input interface rendered to a group-based communication interface displayed to the sending user client device. In some embodiments of the apparatus, the messaging communication transmission request is generated in response to user engagement of a messaging communication input interface rendered to a group-based communication interface displayed to the sending user client device. In some embodiments of the apparatus, the messaging communication transmission request is generated in response to user engagement of a calendar messaging input interface rendered to a group-based communication interface displayed to the sending user client device. In some embodiments of the apparatus, the linked message object comprises an invite request interface that is configured to, when engaged by a user associated with the external user identifier, cause initiation of a new member onboarding protocol associated with the external user identifier and the group-based communication workspace identifier. In some embodiments of the apparatus, the new member onboarding protocol causes assignment of guest access privileges associated with the external user identifier and the group-based communication workspace identifier. In some embodiments of the apparatus, the new member onboarding protocol causes assignment of full member access privileges associated with the external user identifier and the group-based communication workspace identifier.

In some embodiments, the at least one non-transitory memory and the program code are configured to, with the at least one processor, cause the apparatus to execute the new member onboarding protocol by, in response to receiving, from an external client device associated with the external user identifier, an authorization confirmation associated with the invite request interface, generating an authorization request based on the authorization confirmation, the authorization confirmation comprising the external user identifier, the sponsor user identifier, and the group-based communication workspace identifier, causing transmission of the authorization request to an admin client device associated with the group-based communication workspace identifier, and in response to receiving an approval indication associated with the group-based communication workspace identifier, updating a sharing approval repository to add a sharing approval indication associated with the external user identifier and the group-based communication workspace identifier.

Another embodiment is directed to a computer program product comprising at least one non-transitory computer-readable storage medium having computer-readable program code portions stored therein, the computer-readable program code portions comprising an executable portion configured to, in response to receiving an external user directory corpus associated with a sponsor user identifier and a group-based communication workspace identifier, store the external user directory corpus in association with the sponsor user identifier and the group-based communication workspace identifier. The computer-readable program code portions comprising the executable portion are further configured to receive a messaging communication transmission request from a sending user client device associated with the group-based communication workspace identifier, the messaging communication transmission request comprising message data and an external user identifier selected from the external user directory corpus. The computer-readable program code portions comprising the executable portion are further configured to cause transmission of the message data to an external messaging resource address associated with the external user identifier for display by an external messaging resource as a linked message object.

In some embodiments, the computer-readable program code portions comprising the executable portion are further configured to, prior to receiving the messaging communication transmission request, receive a recipient identifier from the sending user client device associated with the group-based communication workspace identifier, query a user directory including the external user directory corpus based on the recipient identifier, generate a suggested recipient user identifier set drawn at least in part from the external user directory corpus based on the recipient identifier, and cause display of the suggested recipient user identifier set to the sending user client device, wherein the messaging communication transmission request further indicates selection of the external user identifier from the suggested recipient user identifier set.

In some embodiments of the computer program product, the messaging communication transmission request is generated in response to user engagement of a direct messaging input interface rendered to a group-based communication interface displayed to the sending user client device. In some embodiments of the computer program product, the messaging communication transmission request is generated in response to user engagement of a messaging communication input interface rendered to a group-based communication interface displayed to the sending user client device. In some embodiments of the computer program product, the messaging communication transmission request is generated in response to user engagement of a calendar messaging input interface rendered to a group-based communication interface displayed to the sending user client device. In some embodiments of the computer program product, the linked message object comprises an invite request interface that is configured to, when engaged by a user associated with the external user identifier, cause initiation of a new member onboarding protocol associated with the external user identifier and the group-based communication workspace identifier. In some embodiments of the computer program product, the new member onboarding protocol causes assignment of guest access privileges associated with the external user identifier and the group-based communication workspace identifier. In some embodiments of the computer program product, the new member onboarding protocol causes assignment of full member access privileges associated with the external user identifier and the group-based communication workspace identifier.

In some embodiments, the computer-readable program code portions comprising the executable portion are further configured to execute the new member onboarding protocol by, in response to receiving, from an external client device associated with the external user identifier, an authorization confirmation associated with the invite request interface, generating an authorization request based on the authorization confirmation, wherein the authorization confirmation comprises the external user identifier, the sponsor user identifier, and the group-based communication workspace identifier, causing transmission of the authorization request to an admin client device associated with the group-based communication workspace identifier, and in response to receiving an approval indication associated with the group-based communication workspace identifier, updating a sharing approval repository to add a sharing approval indication associated with the external user identifier and the group-based communication workspace identifier.

Another embodiment is directed to a method comprising, in response to receiving an external user directory corpus associated with a sponsor user identifier and a group-based communication workspace identifier, storing the external user directory corpus in association with the sponsor user identifier and the group-based communication workspace identifier. The method further comprises receiving a messaging communication transmission request from a sending user client device associated with the group-based communication workspace identifier, the messaging communication transmission request comprising message data and an external user identifier selected from the external user directory corpus. The method further comprises causing transmission of the message data to an external messaging resource address associated with the external user identifier for display by an external messaging resource as a linked message object.

In some embodiments, the method further comprises, prior to receiving the messaging communication transmission request, receiving a recipient identifier from the sending user client device associated with the group-based communication workspace identifier, querying a user directory including the external user directory corpus based on the recipient identifier, generating a suggested recipient user identifier set drawn at least in part from the external user directory corpus based on the recipient identifier, and causing display of the suggested recipient user identifier set to the sending user client device, wherein the messaging communication transmission request further indicates selection of the external user identifier from the suggested recipient user identifier set.

In some embodiments of the method, the messaging communication transmission request is generated in response to user engagement of a direct messaging input interface rendered to a group-based communication interface displayed to the sending user client device. In some embodiments of the method, the messaging communication transmission request is generated in response to user engagement of a messaging communication input interface rendered to a group-based communication interface displayed to the sending user client device. In some embodiments of the method, the messaging communication transmission request is generated in response to user engagement of a calendar messaging input interface rendered to a group-based communication interface displayed to the sending user client device. In some embodiments of the method, the linked message object comprises an invite request interface that is configured to, when engaged by a user associated with the external user identifier, cause initiation of a new member onboarding protocol associated with the external user identifier and the group-based communication workspace identifier. In some embodiments of the method, the new member onboarding protocol causes assignment of guest access privileges associated with the external user identifier and the group-based communication workspace identifier. In some embodiments of the method, the new member onboarding protocol causes assignment of full member access privileges associated with the external user identifier and the group-based communication workspace identifier.

In some embodiments of the method, executing the new member onboarding protocol further comprises, in response to receiving, from an external client device associated with the external user identifier, an authorization confirmation associated with the invite request interface, generating an authorization request based on the authorization confirmation, wherein the authorization confirmation comprises the external user identifier, the sponsor user identifier, and the group-based communication workspace identifier, causing transmission of the authorization request to an admin client device associated with the group-based communication workspace identifier, and in response to receiving an approval indication associated with the group-based communication workspace identifier, updating a sharing approval repository to add a sharing approval indication associated with the external user identifier and the group-based communication workspace identifier.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1:
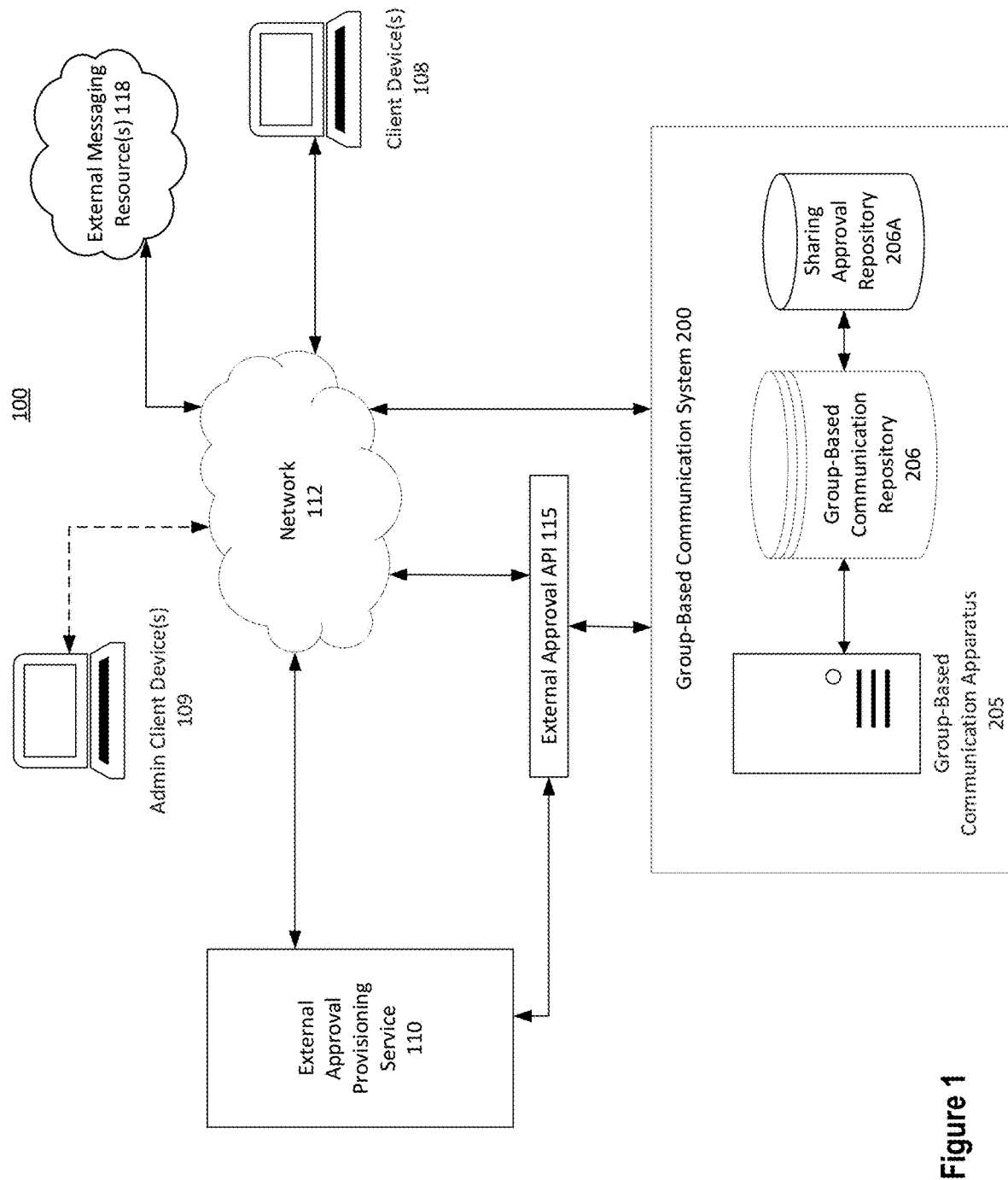
FIG. 1 shows a schematic view of a group-based communication system in communication with client devices according to various embodiments of the present disclosure.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Overview

Users of a group-based communication system may communicate with one another in a myriad of ways. For example, a user may be a member of one or more group-based communication workspaces, each group-based communication workspace dedicated to a particular organizational group or team having a defined member list (i.e., a defined list of authenticated user profiles). In this regard, members of a group-based communication workspace may each be associated with a particular group identifier and/or a particular organization identifier.

Each group-based communication workspace may include a plurality of group-based communication channels. Upon accessing a group-based communication interface to interact with an associated group-based communication channel, a user (by way of a client device) may generate and transmit one or more messaging communications to a group-based communication server to be rendered within the group-based communication interface. The user may also view, respond to, and/or otherwise interact with one or more messaging communications posted to a group-based communication channel by other members of the particular group-based communication channel.

One of the basic tenets of group-based communication workspaces and group-based communication channels is that only invited/authorized users may become members. Thus, certain members of the group-based communication channel and/or group-based communication workspace must be admin users vested with authority to manage the group-based communication channels, workspaces, and other group-based communication resources. Admin users must be equipped to make decisions on behalf of other members regarding new member invitations and associated access rights. For example, admin users must approve new requests to invite internal and external users to join and/or access a group-based communication workspace, a group-based communication channel, or other group-based communication resource.

For example, when a user, Adrian, from Acme Corporation intends to collaborate or share data (for example, exchanging messaging communications) with another user, Lisa, from Beta Brands and another user, Thomas, from Global Logistics, Adrian may create an externally shared communication channel (e.g., #wholesale-strategy) for this purpose. Once membership for Lisa and Thomas has been validated through an admin administered authorization and confirmation process, Adrian, Lisa, and Thomas may freely communicate and collaborate via the #wholesale-strategy externally shared communication channel. Multiple additional member users from Acme Corporation, Beta Brands, Global Logistics, and/or any other organizations may be added through similar admin administered authorization and confirmation processes.

It is desirable to maintain privacy protocols over information posted to group-based communication channels and associated group-based communication workspaces. Organization identification for users interacting within a group-based communication channel may be a determinative parameter for certain privacy protocols. For example, various embodiments discussed herein enable organization admins to apply data retention settings to messaging communications posted by member users from their respective organizations. Thus, an admin user from Acme Corporation could establish data retention settings that apply to messaging communications posted by Adrian to the #wholesale-strategy channel while an admin user from Beta Brands could establish different data retention settings that apply to messaging communications posted by Lisa and so on.

In some embodiments, admin users may utilize an external service, such as an external approval provisioning service, that is separate and distinct from the group-based communication system to manage group-based communication resource sharing requests. In one example, an external approval provisioning service is configured as an identity provisioning service (IDP) that creates, manages, authenticates, validates, and deletes digital identities on behalf of member organizations. In another example, an external approval provisioning service is configured as an enterprise process management service that creates, tracks, and manages workflows, projects, and tasks for member organizations.

Turning to the example noted above, an admin user, Adam, for Acme Corporation may use an IDP to manage all group-based communication resource sharing requests on behalf of Acme Corporation. This would obviously include reviewing and approving Adrian's invitations to Lisa and Thomas to join #wholesale-strategy that were referenced above.

Various embodiments of the present disclosure are directed to an improved group-based communication apparatus that is configured to cause transmission of an authorization request to an external approval provisioning service and receive a resource sharing response event from the external approval provisioning service via an external approval application programming interface (API). This external approval API is the conduit though which Adam's IDP obtains the necessary data and instructions to efficiently manage Acme Corporation's group-based communication resource sharing requests. Importantly, various embodiments of the present invention allow admin users like Adam to manage group-based communication resource sharing requests directly through an external approval provisioning service rather than, for example, requiring such admin users to leave their preferred external approval provisioning service to manage such group-based communication resource requests directly in an interface of the group-based communication system.

In certain instances, it may be desirable for users within a group-based communication workspace and/or group-based communication channel to communicate and collaborate with one or more users who are not yet actual users of the group-based communication system. For example, returning to the example referenced above, Adrian may wish to ingest his contacts list into the group-based communication system to make sending invitations easier and to otherwise allow him to communicate with external users directly from the group-based communication system. Importantly, Adrian's contact list (referred to herein as an external user directory corpus) may include Acme Corporation users who are already members of the group-based communication system but also includes at least one external user who has never logged onto, and has no user profile within, the group-based communication system.

For example, Adrian's contact list includes an email address for Francis of Beta Brands and Francis is not an authorized user of the group-based communication system. This stands in contrast to, for example, Lisa of Beta Brands who may not have been a member of a particular group-based communication channel (#wholesale-strategy) before Adrian's invitation but was an active group-based communication system user involved in her own set of group-based communication channels (#foodtruck-frenzy, #john-hughes-film-reviews, etc.).

It is desirable in this circumstance that Adrian be able to communicate with Francis using the group-based communication system. For example, Adrian may wish to post a status update message to a #marketing-strategy channel and to ensure that Francis receives the message to his external messaging resource of choice (e.g., Gmail® from Google) while also ensuring that Francis is provided with the means to join the group-based messaging system and/or the #marketing-strategy channel should he choose to do so. Francis' choice in this regard may kick off a new member onboarding protocol that is managed by admin user Adam of Acme Corporation as discussed in detail below.

Definitions

As used herein, the terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be transmitted directly to another computing device or may be transmitted indirectly via one or more intermediary computing devices, such as, for example, one or more servers, relays, routers, network access points, base stations, hosts, and/or the like.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

The term "user" should be understood to refer to an individual, group of individuals, business, organization, and the like. The users referred to herein are enabled to access a group-based communication system using client devices. Each user of the group-based communication system is associated with at least one "group identifier." Each group identifier may be one or more items of data by which a group may be uniquely identified. For example, in one embodiment, a group identifier may be stored as a 64-bit unsigned integer and represented externally (outside of memory) as a base-34 encoded string. In other embodiments, the group identifier may comprise a combination of ASCII characters.

"Group-based" is used herein to refer to a system, channel, communication, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group or team identifiers (defined below) are used to associate data, information, messages, users, group-based communication channels, etc., with specific groups of a group-based communication system as defined below.

The term "group-based communication system" refers to a communications software platform and associated hardware that is configured to support and maintain a plurality of group-based communication workspaces and all associated functionality. Group-based communication system users are organized into organization groups (e.g., employees of different companies may be separate organization groups) and each group interacts with the system via a respective group-based communication workspace. For example, the group-based communication system might support, among others, a Slack Corporation group-based communication workspace and an ACME Corporation group-based communication workspace. Example group-based communication systems comprise supporting servers, client devices, and third-party resources. An example group-based communication system is Slack® by Slack Technologies, Inc.

The terms "user profile" refer to information of a group-based communication system that is associated with a user, including, for example, a user identifier, a role identifier, one or more group-based communication channel identifiers associated with group-based communication channels that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, an avatar, an email address, a real name (e.g., John Doe), a username (e.g., j doe), a password, a real name, a time zone, a status, and the like. The user profile details can include a subset designation of user credentials, such as, for example, login information for the user including the user's username and password.

As used herein, the term "user identifier" refers to one or more items of data by which a user and this user's corresponding user profile may be identified within a group-based communication system. For example, a user identifier may comprise ASCII text, a pointer, a memory address, or other unique identifier.

A "role identifier" refers to one or more items of data by which a role of a user may be identified and is associated with a user profile. A role of a user may refer to the status of the user within the group-based communication channel, the company associated with the user or group, or other type of role. For example, a channel comprising users associated with a particular commercial organization may comprise roles such as "employee," "associate," "client," "supervisor," "admin," and the like. For example, a role identifier may comprise ASCII text, a pointer, a memory address, or other unique identifier.

The term "team identifier" refers to one or more items of data by which a group or workspace within a group-based communication system may be identified. For example, a team identifier may comprise ASCII text, a pointer, a memory address, and the like. Team identifiers are used to distinguish group-based communication channels, messages, files, members, etc., associated with one group-based communication workspace from another group-based communication workspace.

The term "organization identifier" refers to one or more items of data by which an organization within a group-based communication system may be uniquely identified. In embodiments, differing organizations as referenced herein refer to different enterprises or corporations (e.g., Acme Corporation, Beta Brands, etc.) with different information technology infrastructures (e.g., network security protocols, firewalls), admin users, information technology policies, and the like. For example, an organization identifier may comprise ASCII text, a pointer, a memory address, and the like.

The term "group-based communication apparatus" or "group-based communication server" refers to a software platform and associated hardware (e.g., server, etc.) that is configured to manage access to the various group-based communication workspaces (defined below) of the group-based communication system. The group-based communication apparatus is configured to access, maintain, and support application product logic of the group-based communication system and to access one or more data repositories such as a group-based communication repository.

The term "group-based communication workspace" refers to a virtual communications environment configured to facilitate user interaction with a group-based communication system. Each group-based communication workspace is accessible and viewable (as a group-based communication interface defined below) to a select group of users, such as a group of employees of a business or organization (e.g., an Acme Corporation workspace named acme-global.slack.com may be accessible and viewable to the Acme employees however the Beta Brands group-based communication workspace named beta-develop.slack.com would not be accessible and viewable to Acme employees. The group-based communication workspace includes a plurality of group-based communication channels (e.g., a marketing channel, a sales channel, an accounting channel, etc.), which are defined herein. In various embodiments, user profiles sharing a common group identifier (defined below) form part of a common group-based communication workspace.

The term "group-based communication interface" is a graphical user interface of a group-based communication system that is configured to allow users to (e.g., group members) to view and engage a group-based communication workspace. A group-based communication interface is rendered to a client device based on data and instructions provided by the group-based communication system. In some embodiments, such data and instructions are facilitated by a dedicated software application running on the client device. In other embodiments, such data and instructions are provided through a web browser running on the client device. Each group-based communication interface is visually configured to define a sidebar pane and a message pane. A "sidebar pane" is configured to display lists of group-based communication channels and/or shared group-based communication channels and is typically organized by group-defined titles (defined below). A "message pane" is configured to display one or more messages of a group-based communication channel upon user selection of a group-based communication channel from the sidebar pane.

The term "group-based communication channel" refers to a virtual communications environment or feed that is configured to display messaging communications posted by channel members (e.g., validated users accessing the environment using client devices) that are viewable only to the members of the channel. The format of the group-based communication channel may appear differently to different members of the group-based communication channel; however, the content of the group-based communication channel (i.e., messaging communications) will be displayed to each member of the group-based communication channel. For instance, a common set of group-based messaging communications will be displayed to each member of the respective group-based communication channel such that the content of the group-based communication channel (i.e., messaging communications) will not vary per member of the group-based communication channel. Group-based communication channels are typically organized in list form within the sidebar of the group-based communication interface based on group-defined titles. A "group-defined title" is a channel name or text string that is conceived and stored at the time a group-based communication channel is created for common identification to all members of the group-based communication channel. In many embodiments, group-defined titles are created based on a group-wide nomenclature/procedure so that group members may readily understand the purpose of any associated group-based communication channel. Example group-defined titles include: #accounting—audit 2019, #accounting—payroll, #HR—onboarding procedure, #food truck frenzy, and the like. A shared group-based communication channel may have a unique group-defined title for each user identifier and/or group identifier associated with the shared group-based communication channel.

The term "externally shared group-based communication channel" refers to a group-based communication channel having members affiliated with different organizations or commercial enterprises. In this regard, an externally shared group-based communication channel is accessible and viewable by users associated with different organization identifiers. An externally shared group-based communication channel may be generated in an instance in which a group-based communication apparatus updates a sharing approval repository to at least add a sharing approval indication associated with a recipient organization identifier and the group-based communication channel identifier. Additionally, or alternatively, the sharing approval repository may be updated to add a sharing approval indication associated with the group-based communication resource identifier.

The term "internally shared group-based communication channel" refers to a group-based communication channel having members affiliated with the same organization or commercial enterprise. In this regard, an internally shared group-based communication channel is accessible and viewable by users associated with a common organization identifier. An internally shared group-based communication channel may be generated in an instance in which a group-based communication apparatus updates a sharing approval repository to at least add a sharing approval indication associated with a recipient user identifier and the group-based communication channel identifier.

The terms "group-based communication channel identifier" or "channel identifier" refer to one or more items of data by which a group-based communication channel or shared group-based communication channel may be identified. For example, a group-based communication channel identifier may comprise ASCII text, a pointer, a memory address, and the like.

The term "messaging communication" refers to any electronically generated digital content object provided by a user using a client device and that is configured for display within a group-based communication channel. In some examples, a messaging communication may be automatically generated by a group-based communication server. Message communications may include message data, such as any text, image, video, audio or combination thereof provided by a user (using a client device). For instance, the user may provide a messaging communication that includes message data such as text as well as an image and a video within the messaging communication as message contents. In such a case, the text, image, and video would comprise the messaging communication. Each messaging communication sent or posted to a group-based communication channel of the group-based communication system includes message metadata comprising the following: a sending user identifier, a message identifier, a group identifier, and a group-based communication channel identifier. In some embodiments, message metadata also comprises an organization identifier associated with the sending user and a timestamp that identifies the time that a messaging communication was transmitted (i.e., sent) or posted to a group-based communication channel. Each of the foregoing identifiers may comprise ASCII text, a pointer, a memory address, and the like. In addition to message metadata, messaging communications also include body content data that comprises text, an image, a file, video, or the like.

A "sending user identifier" is a unique identifier associated with: a collection of messaging communications or requests that are sent by a particular user (e.g., sent by a client device associated with the particular user, user identifier, or user profile), and/or a resource sharing interface request that is configured to initiate a sharing approval review process associated with a group-based communication resource. A sending user identifier may comprise ASCII text, a pointer, a memory address, and the like.

A "recipient entity identifier" is a unique identifier associated with a resource sharing interface request that is configured to initiate a sharing approval review process associated with a group-based communication resource. A recipient entity identifier may comprise ASCII text, a pointer, a memory address, and the like. Example recipient entity identifiers include recipient user identifiers and recipient organization identifiers.

Group-based communication system users may join group-based communication channels. Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a messaging communication (e.g., access to the messaging communication may be restricted to those users having the group-based communication channel identifier associated with their user profile, or who have the ability to join the group-based communication channel). The group-based communication channel identifier may be used to determine context for the messaging communication (e.g., a description of the group-based communication channel, such as a description of a project discussed in the group-based communication channel, may be associated with the group-based communication channel identifier).

The term "message metadata" refers to data that describes messaging communications and is used to index, render, query, or organize messaging communications within a group-based communication system. Each messaging communication sent or posted to a group-based communication channel of the group-based communication system includes message metadata comprising the following: a sending user identifier, a message identifier, a group identifier, and a group-based communication channel identifier. In some embodiments, the message metadata comprises an organization identifier associated with the sending user identifier and a timestamp that identifies the time that the messaging communication was sent or posted. As graphical objects are added or appended to a selected message communication (e.g., as emojis or reaction), the group-based communication system is configured to add graphical object identifiers associated with such added graphical objects to the message metadata associated with the selected messaging communication.

The term "group-based communication resource" refers to any element provided by the group-based communication system that users may utilize and/or share for group-based communication. Examples of group-based communication resources include group-based communication workspaces, group-based communication channels, direct messages, multi-person direct messages, group-based communication files, group-based communication data objects, and/or the like. The term "shared resource" refers to a group-based communication resource having members and/or associated with user identifiers affiliated with the same or different organization identifiers. In this regard, a shared group-based communication resource is accessible and viewable by users having client devices associated with similar or different group identifiers, organization identifiers, and the like. A shared group-based communication resource may be generated in an instance in which a group-based communication apparatus updates a sharing approval repository to at least add a sharing approval indication associated with a group-based communication resource identifier and a recipient entity identifier.

The term "group-based communication resource identifier" refers to one or more items of data by which a particular group-based communication resource within a group-based communication system may be identified. For example, a group-based communication resource identifier may comprise ASCII text, a pointer, a memory address, and the like. Examples of group-based communication resource identifiers include group-based communication channel identifiers, group-based communication workspace or team identifiers, and/or the like.

The term "channel sharing interface request" refers to a demand or instruction created by a client device upon user engagement with an interface element indicating an intention to share a group-based communication channel. The channel sharing interface request includes a sending user identifier associated with the user who initiated the channel sharing interface request and a group-based communication channel identifier associated with a group-based communication channel to be shared. The channel sharing interface request also includes a recipient entity identifier that is associated with the user and/or organization that is the target for sharing the group-based communication channel. The channel sharing interface request is configured to trigger the group-based communication apparatus to initiate a sharing approval process that may culminate in sharing access to a group-based communication channel with a recipient user associated with a recipient entity identifier.

The term "resource sharing interface request" refers to a demand or instruction created by a client device upon user engagement with an interface element indicating an intention to share a group-based communication resource. The resource sharing interface request includes a sending user identifier associated with the user who initiated the resource sharing interface request and a group-based communication resource identifier associated with a group-based communication resource to be shared. The resource sharing interface request also includes a recipient entity identifier that is associated with the user and/or organization that is the target for sharing the group-based communication resource. The resource sharing interface request is configured to trigger the group-based communication apparatus to initiate a sharing approval process that may culminate in generating of a shareable group-based communication resource. One example resource sharing interface request is a channel sharing interface request. Other examples may focus on workspaces, files, direct messages, and the like.

The term "shared resource invite request" refers to a demand or instruction that is generated by the group-based communication apparatus in response to receiving a resource sharing response event comprising an approval indication from an external approval provisioning service. The shared channel invite request includes a sending user identifier associated with the user who initiated the resource sharing interface request and a group-based communication resource identifier associated with a group-based communication resource to be shared. The shared resource invite request also includes a recipient entity identifier that is associated with the user and/or organization that is the target for sharing the group-based communication resource. Said differently, the shared resource invite request includes all of the data and instructions necessary for a recipient entity (e.g., recipient user or recipient organization that is managed through a recipient admin user) to consider an invitation to become a member of a shared resource.

The term "authorization request" refers to a demand or instruction that is generated by the group-based communication apparatus in response to receiving a resource sharing interface request from a client device associated with a sending user identifier. The authorization request includes data similar to data included in a resource sharing interface request, including a group-based communication resource identifier and a recipient entity identifier. The authorization request is provided to an external approval provisioning service or, in some embodiments, to one or more admin client devices. In some embodiments, data associated with the authorization request may be rendered in the form of an authorization interface to an admin client device using external approval provisioning service software.

The term "authorization interface" refers to a modal, window, menu, pane, or other graphical user interface element that is rendered by the external approval provisioning service and is configured to enable admin user selection of an action to be taken associated with an authorization request. In various embodiments discussed herein, the group-based communication apparatus is configured to provide data and instructions associated with an authorization request to the external approval provisioning service so that such service is enabled to render an authorization interface for engagement by an admin user.

The term "admin user" refers to a subscriber of a group-based communication channel or workspace who has authority to manage the group-based communication channel or workspace and associated resources and make decisions on behalf of other subscribers regarding various maintenance tasks. For example, an admin user may have the authority to set a communication channel as either "public" or "private." As another example, when receiving a request such as an authorization request, only an admin user has the authority to accept the request on behalf of the group. Admin users as discussed herein often manage their responsibilities on behalf of an organization using an external approval provisioning service as discussed herein.

The term "admin client device" refers to computer hardware and/or software that is configured to access a service made available by a server. The server is often (but not always) on another computer system, in which case the admin client device accesses the service by way of a network. Admin client devices may include, without limitation, smart phones, tablet computers, laptop computers, wearables, personal computers, enterprise computers, and the like. The admin client device is a client device associated with an admin user. An admin client device is associated with an admin user identifier. In various embodiments discussed herein, an admin client device is configured to access an external approval provisioning service for managing user access credentials and user identity management, as well as user shared resource requests, authorization requests, and initiating transmission of resource sharing response events.

The term "group-based communication repository" refers to the location, such as a memory device, where data, such as data associated with one or more group-based communication channels and other group-based communication resources are stored. The group-based communication repository may be a dedicated device and/or a part of a larger repository. The group-based communication repository may be dynamically updated or be static. For example, table data may be uploaded to the group-based communication repository simultaneously with the generation of a shared resource interface request and/or generation of a confirmation indication associated with the shared resource interface request. Alternatively, data may not be uploaded simultaneously upon generation and instead may be batch uploaded based on other factors, such as based on time intervals (e.g., uploads occur every 15 minutes), user initiation (e.g., user may press a button to initiate the upload), or the like. The group-based communication repository may be encrypted in order to limit unauthorized access of data and associated engagement data. One portion of the group-based communication repository is allocated to a "sharing approval repository" that tracks connections and disconnections for any group-based communication resource. More particularly, the sharing approval repository may be a table that is configured for storing a sharing approval indication, a sharing denial indication, a disconnection indication, and/or a reconnection indication correlated to specific user identifiers and/or organization identifiers for each group-based communication resource.

The term "sharing approval indication" refers to an indicator, such as a flag, stored in a sharing approval repository of a group-based communication repository by a group-based communication apparatus. The sharing approval indication is associated with a group-based communication resource identifier and a recipient entity identifier or an external user identifier. The sharing approval indication is stored by the group-based communication apparatus in response to receiving an approval indication from an admin client device. The presence of a sharing approval indication in a group-based communication repository indicates that the group-based communication resource associated with the particular group-based communication resource identifier is shared with one or more users associated with the recipient entity identifier or the external user identifier. The term "approval timestamp" refers to data representing a date on which the shared resource candidate request was approved by one or more admin users. In some embodiments, the sharing approval indication comprises an approval timestamp.

The term "sharing denial indication" refers, in some embodiments, to an indicator, such as a flag, stored in a sharing approval repository of a group-based communication repository by a group-based communication apparatus. The sharing denial indication is associated with a group-based communication resource identifier and a recipient entity identifier or an external user identifier. The sharing denial indication is stored by the group-based communication apparatus in response to receiving a denial indication from an admin client device. The presence of a sharing denial indication in a group-based communication repository indicates that the group-based communication resource associated with the particular group-based communication resource identifier is not to be shared with one or more users associated with the recipient entity identifier or the external user identifier. The term "denial timestamp" refers to data representing a date on which the shared resource candidate request was approved by one or more admin users. In some embodiments, a group-based communication apparatus may update a sharing approval repository to add a sharing denial indication by simply removing a prior sharing approval indication. In other words, separate flags or indicators may not be needed in the sharing approval repository to indicate both "shared" and "denied" states.

The term "external approval provisioning service" refers to a software program, application, platform, or service that is configured to communicate with the group-based communication system for providing invitation approval, access credential management, and other enterprise software process management services to one or more users (e.g., admin users). The external approval provisioning services is not a native service for the group-based communication system and operates on a compiled code base or repository that is separate and distinct from that which supports the group-based communication system. In some embodiments, external approval provisioning services configured as described herein communicate with the group-based communication system, and vice versa, through an external approval application program interface (API). In one example, an external approval provisioning service is configured as an identity provisioning service (IDP) that creates, manages, authenticates, validates, and deletes digital identities on behalf of member organizations. In another example, an external approval provisioning service is configured as an enterprise process management service that creates, tracks, and manages workflows, projects, and tasks for member organizations.

The term "authorization confirmation" refers to a demand or instruction that is generated by recipient entity client device (e.g., a client device associated with a particular recipient user, an admin user device associated with a particulate recipient organization, etc.) and transmitted to the group-based communication apparatus following receipt of a shared resource invite request and once the recipient entity confirms approval to join the shared resource. In various embodiments discussed herein, an authorization confirmation is generated in response to the recipient entity user indicating an intention to join the shared resource through engagement of an invite request interface that is rendered to the recipient entity client device.

The term "resource sharing response event" refers to a demand or instruction that is generated by an external approval provisioning service and transmitted to the group-based communication apparatus through an external approval API in circumstances where an admin user uses the external approval provisioning service to approve or deny an authorization request associated with a resource sharing interface request. The resource sharing response event is triggered after the external approval provisioning service receives an authorization request and an admin user associated with the external approval provisioning service subsequently approves or denies the request. In some embodiments, a resource sharing response event comprises an approval indication indicating the authorization request was approved or a denial indication indicating the authorization request was denied.

The term "external messaging resource" refers to a software program, application, platform, or service that is configured to provide electronic messaging services to users operating client devices. In some embodiments, an external messaging resource is an external email resource configured to provide electronic mail ("email") services to users operating client devices. The external email resource comprises an email client, a simple mail transfer protocol ("SMTP") server, and a domain name server ("DNS"). The external email resource is configured to allow a sending user ("a sender") to create and transmit an email message to a receiving user ("a recipient"). Each email message comprises an email envelope that defines its electronic format, an email header that includes sender/recipient information and an email subject line, and an email body that includes text, images, and file attachments. The external email resource operates on a compiled code base or repository that is separate and distinct from that which supports the group-based communication system. An external email resource may be associated with several external email resource entities of one or more users.

An email client of the external email resource may be used by a sender to create and transmit an email message. The email message text and attachments are thus uploaded to the SMTP server as outgoing mail. A copy of the email message is stored to an email outbox associated with the sender for later retrieval. The SMTP server communicates with the DNS to find a recipient email server using recipient information drawn from the email header. Once the SMTP server finds the recipient email server, it transfers the email message to the recipient email server. The next time the recipient accesses the email client, the email client downloads the email message from the recipient email server for presentation to the recipient in an email inbox interface. The external email resource may also include programs, applications, platforms, or services configured to provide services related to providing email services.

In some embodiments, an external messaging resource is an external text messaging resource configured to provide electronic short message service (SMS) text message services to users operating client devices. The external text messaging resource allows the exchange of SMS text messages between a mobile station and a wireless system, and between the wireless system and a client device capable of transmitting and receiving SMS text messages. The external device may be a telephone, such as a smartphone or the like. The external text messaging resource consists of message entry features, administration features, and message transmission capabilities. These features are distributed between a wireless system and an SMS message center that together make up the external text messaging resource. The SMS message center may be either separate from or physically integrated into the wireless system. SMS entry features are provided through interfaces to the message center and the mobile station. Users may use these interfaces to input SMS text messages, destination addresses, and various delivery options.

An external messaging resource may receive "message data" associated with a group-based communication message from the group-based communication system. The communication message data may be templated or structured template information that is consistent with the external messaging resource that is to receive this data. The communication message data may be rendered as a linked message object by the external messaging resource.

The term "linked message object" refers to message object that is formatted and structured for display by an external messaging resource, but which includes an invite request interface that is configured to trigger a new member onboarding protocol within a group-based communication system. In this way a linked message object is configured to work with and effectively connect or link two platforms, namely, an external messaging resource and a group-based communication system.

The term "linked message engagement data" refers to data reflecting user input representing an attempt to render text, emoji, links, or the like included in the linked message object. An external messaging resource may transmit an authorization confirmation to the group-based communication system based on engagement from a user with a messaging client associated with the external messaging resource. In some embodiments, an external messaging resource may also transmit "external message data" comprising a group identifier and a group-based communication channel identifier to a group-based communication system. The group-based communication system may parse the external message data and render, within a group-based communication interface, a group-based communication message based on the external message data to the group-based communication channel identified by the group-based communication channel identifier in the external message data.

The term "external user directory corpus" refers to a user contacts folder or repository containing user contact data wherein at least one user listed in among the user contact data is associated with at least one external user identifier. An external user directory corpus is associated with a particular sponsor user identifier and may be imported into a group-based communication system. In one embodiment, the external user directory corpus is a contact or user address list exported from an external messaging resource. For example, an external user directory corpus may be a comma-separated values file of user contact info exported by an email service.

The term "sponsor user identifier" refers to a user identifier associated with a user who has initiated ingestion of an external user directory corpus into the group-based communication system. The user contact data of an external user directory corpus can include an external user identifier and an external messaging resource address, such as an email address, telephone number, and/or other unique identifier associated with the external messaging resource. In an embodiment, each external messaging resource address in an external user directory corpus is associated with the same domain (e.g., the same email domain). An external user directory corpus is received from a client device associated with the sponsor user identifier. An external user directory corpus is associated with a sponsor user identifier and a group-based communication workspace identifier. An external user directory corpus may be stored in a group-based communication repository in association with the sponsor user identifier and the group-based communication workspace identifier.

The term "messaging communication request" refers to a demand or instruction that is generated by a sending user client device and associated with the generation of a messaging communication. The messaging communication request is triggered by user engagement of a message pane of a group-based communication interface. The messaging communication request transmitted to and received by the group-based communication apparatus. Receival of a messaging communication request by the group-based communication apparatus triggers generation of a suggested recipient user identifier set. In some embodiments, the messaging communication request comprises a directory query generated based on user input associated with a messaging communication input interface rendered to a group-based communication interface displayed by the sending user client device.

The term "suggested recipient user identifier set" refers to a set of one or more user identifiers and/or external user identifiers generated by a group-based communication apparatus in response to receiving a messaging communication request by the group-based communication apparatus. A suggested recipient user identifier set may comprise one or more external user identifiers drawn from an external user directory corpus and, in some embodiments, is based on a directory query of a messaging communication request.

The term "messaging communication transmission request" refers to a demand or instruction that is generated by a client device upon a user at the client device engaging with an interface element associated with sending a messaging communication. A messaging communication transmission request is received by a group-based communication apparatus. The messaging communication transmission request may comprise message data and is associated with at least one user identifier or external user identifier.

The term "external user identifier" refers to one or more items of data in the form of a unique identifier by which a user unaffiliated with a group-based communication system may be identified within the group-based communication system. For example, a user identifier may comprise ASCII text, a pointer, a memory address, or other unique identifier.

The term "external messaging resource address" refers to an address associated with an external user data object of an external user directory corpus. A group-based communication apparatus causes transmission of message data to an external messaging resource address for rendering by an external email resource as a linked message object. In some embodiments, an external messaging resource address may be an email address.

The term "direct messaging input interface" refers to a modal, window, menu, pane, or other graphical user interface element rendered to a group-based communication interface at a client device that is configured to enable a user engagement of the direct messaging input interface to construct message data of one or more direct messages and/or multi-person direct messages and trigger generation of messaging communication transmission request by the client device.

The term "messaging communication input interface" refers to a modal, window, menu, pane, or other graphical user interface element rendered to a group-based communication interface at a client device that is configured to enable a user engagement of the messaging communication input interface to construct message data of one or more messaging communications and trigger generation of messaging communication transmission request by the client device.

The term "invite request interface" refers to a button, widget, link, or other user interface element included in a linked messaging object rendered by an external messaging resource. User engagement of an invite request interface causes initiation of a new member onboarding protocol associated with the external email resource. User engagement of an invite request interface further causes an authorization confirmation to be generated and transmitted to a group-based communication apparatus.

Example System Overview

Methods, apparatuses, and computer program products of the present disclosure may be embodied by any of a variety of devices. For example, the method, apparatus, and computer program product of an example embodiment may be embodied by a networked computing device (e.g., an enterprise platform), such as a server or other network entity, configured to communicate with one or more devices, such as one or more client devices. Additionally, or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example computing system 100 within which embodiments of the present disclosure may operate. Users, such as Adrian and Lisa, may access a group-based communication system 200 via a communications network 112 using client devices 108. In an embodiment, the client devices 108 may comprise one or more admin client devices 109, e.g., a client device operated by an admin user, such as Adam. The group-based communication system 200 may comprise a group-based communication apparatus 205 in communication with at least one group-based communication repository 206. In some embodiments, the group-based communication repository 206 may further comprise a sharing approval repository 206A.

Communications network 112 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 112 may include a cellular telephone, an 802.11, 802.16, 802.20, and/or WiMax network. Further, the communications network 112 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system. In some embodiments, the protocol is a custom protocol of JSON (JavaScript Object Notation) objects sent via a Websocket channel. In some embodiments, the protocol is JSON over RPC ("remote procedural call), JSON over REST ("Representational State Transfer")/HTTP ("Hypertext Transfer Protocol"), and the like.

The group-based communication apparatus 205 may be embodied as a computer or computers. The group-based communication apparatus 205 may provide for receiving of electronic data from various sources, including but not necessarily limited to the client devices 108 and/or admin client devices 109. For example, the group-based communication apparatus 205 may be operable to receive and transmit group-based messaging communications provided by the client devices 108.

The group-based communication repository 206 and sharing approval repository 206A may be embodied as a data storage device such as a Network Attached Storage (NAS) device or devices, or as a separate database server or servers. The group-based communication repository 206 includes information accessed and stored by the group-based communication apparatus 205 to facilitate the operations of the group-based communication system 200. For example, the group-based communication repository 206 may include, without limitation, a plurality of messaging communications organized among a plurality of group-based communication channels, various data associated with one or more users, group-based communication channels and/or workspaces, an external user directory corpus, and/or the like. In some examples, the sharing approval repository 206A may include, without limitation, a plurality of sharing approval indications, sharing denial indications, and/or the like.

The client devices 108 and/or admin client device 109 may be any computing device as defined above. Electronic data received by the group-based communication apparatus 205 from the client devices 108 and/or the admin client devices 109 may be provided in various forms and via various methods. For example, the client devices 108 and/or admin client devices 109 may include desktop computers, laptop computers, smartphones, netbooks, tablet computers, wearables, and the like.

Additionally, or alternatively, in some embodiments, the group-based communication apparatus 205 may be configured, via software, hardware, or a combination thereof, to perform one or more of the operations disclosed herein with respect to managing external authorizations and/or the like. For example, the group-based communication server may be configured with one or more application programming interfaces (APIs) 115 accessible to an external approval provisioning service 110, admin client devices 109, client devices 108 and/or external messaging resources 118.

In embodiments where a client device (e.g., a client device 108 and/or an admin client device 109) is a mobile device, such as a smartphone or tablet, the client device may execute an "app" to interact with the group-based communication system 200. Such apps are typically designed to execute on mobile devices, such as tablets or smartphones. For example, an app may be provided that executes on mobile device operating systems such as iOS®, Android°, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally, or alternatively, client devices may interact with the group-based communication system 200 via a web browser. As yet another example, client devices may include various hardware or firmware designed to interface with the group-based communication system 200.

In some embodiments, the group-based communication system 200, one or more client devices 108, and/or one or more admin client devices 109 may be connected to, or in communication with, one or more external approval provisioning services 110, for example, through the communications network 112. In some embodiments, the group-based communication system 200 may be configured to cause transmission of an authorization request to the external approval provisioning service 110 via an external approval API 115 and receive a resource sharing response from the external approval provisioning service via the external approval API 115. For example, in some embodiments, through his admin client device 109, Adam may utilize the external approval provisioning service 110 for approving and/or denying authorization requests associated with resource sharing interface requests and/or the like, e.g., through one or more commands associated with API 115.

For example, Adrian may request that Lisa be invited to join his group-based communication channel, #wholesale-strategy, and Adam may approve an authorization request, allowing for Lisa to become a member of #wholesale-strategy and interact within the channel.

In an example embodiment, the group-based communication system 200 may also be connected to, or in communication with, one or more external messaging resources 118. The group-based communication system 200, such as the group-based communication apparatus 205, may be in communication with the one or more external messaging resources 118 through the communications network 112. In some embodiments, the group-based communication apparatus 205 may cause transmission of the message data to an external messaging resource address associated with an external user identifier for rendering by the external messaging resource 118 as a linked message object. In other words, continuing with the example above, a message to Francis written by Adrian may be sent to Francis's email address through an external messaging resource.

In some embodiments of an exemplary group-based communication system 200, a messaging communication may be sent from a client device 108 to a group-based communication system 200. In various implementations, the messaging communication may be sent to the group-based communication system 200 over communications network 112 directly by a client device 108, the messaging communication may be sent to the group-based communication system 200 via an intermediary such as a message server, and/or the like. For example, the client device 108 may be a desktop, a laptop, a tablet, a smartphone, and/or the like that is executing a client application (e.g., a group-based communication app). In one implementation, the messaging communication may include data such as a message identifier, sending user identifier, a group identifier, a group-based communication channel identifier, message data (e.g., text, emojis, images, links), attachments (e.g., files), message hierarchy data (e.g., the messaging communication may be a reply to another message), third party metadata, and/or the like.

In one embodiment, the client device 108 (and/or admin client device 109) may provide the following example messaging communication, substantially in the form of a (Secure) Hypertext Transfer Protocol ("HTTP(S)") POST message including eXtensible Markup Language ("XML") formatted data, as provided below:

POST /authrequest.php HTTP/1.1
Host: www.server.com
Content-Type: Application/XML
Content-Length: 667
<?XML version="1.0" encoding="UTF-8" ?>
<auth_request>
<timestamp>2020-12-31 23:59:59</timestamp>
<user_accounts_details>
  <user_account_credentials>
    <user_name>ID_user_1</user_name>
    <password>abc123</password>
    //OPTIONAL <cookie>cookieID</cookie>
    //OPTIONAL
      <digital_cert_link>www.mydigitalcertificate.com/
      JohnDoeDaDoeDoe@gmail.com/mycertifcat-
      e.dc</digital_cert_link>
    //OPTIONAL <digital_certificate>_DATA_</digital_certificate>
  </user_account_credentials>
</user_accounts_details>
<client_details>//iOS Client with App and Webkit

```
//it should be noted that although several client details
//sections are provided to show example variants of
    client
//sources, further messages will include only one to
    save
//space
    <client_IP>10.0.0.123</client_IP>
    <user_agent_string>Mozilla/5.0 (iPhone; CPU iPhone
        OS 7_1_1 like Mac OS X) AppleWebKit/537.51.2
        (KHTML, like Gecko) Version/7.0 Mobile/11D201
        Safari/9537.53</user_agent_string>
    <client_product_type>iPhone6,1</client_product_
        type>
    <client_serial_number>DNXXX1X1XXXX</client_
        serial_number>
    <client_UDID>3XXXXXXXXXXXXXXXXXXXX
        XXXXD</client_UDID>
    <client_OS>iOS</client_OS>
    <client_OS_version>7.1.1</client_OS_version>
    <client_app_type>app with webkit</client_app_type>
    <app_installed_flag>true</app_installed_flag>
    <app_name>nickname.app</app_name>
    <app_version>1.0</app_version>
    <app_webkit_name>Mobile Safari</client_webkit_
        name>
    <client_version>537.51.2</client_version>
</client_details>
<client_details>//iOS Client with Webbrowser
    <client_IP>10.0.0.123</client_IP>
    <user_agent_string>Mozilla/5.0 (iPhone; CPU iPhone
        OS 7_1_1 like Mac OS X) AppleWebKit/537.51.2
        (KHTML, like Gecko) Version/7.0 Mobile/11D201
        Safari/9537.53</user_agent_string>
    <client_product_type>iPhone6,1</client_product_
        type>
    <client_serial_number>DNXXX1X1XXXX</client_
        serial_number>
    <client_UDID>3XXXXXXXXXXXXXXXXXXXX
        XXXXD</client_UDID>
    <client_OS>iOS</client_OS>
    <client_OS_version>7.1.1</client_OS_version>
    <client_app_type>web browser</client_app_type>
    <client_name>Mobile Safari</client_name>
    <client_version>9537.53</client_version>
</client_details>
<client_details>//Android Client with Webbrowser
    <client_IP>10.0.0.123</client_IP>
    <user_agent_string>Mozilla/5.0 (Linux; U; Android
        4.0.4; en-us; Nexus S Build/IMM76D) AppleWeb-
        Kit/534.30 (KHTML, like Gecko) Version/4.0
        Mobile Safari/534.30</user_agent_string>
    <client_product_type>Nexus S</client_product_type>
    <client_serial_number>YXXXXXXXXZ</client_se-
        rial_number>
    <client_UDID>FXXXXXXXXX-XXXX-XXXX-
        XXXX-XXXXXXXXXXXX</client_UDID>
    <client_OS>Android</client_OS>
    <client_OS_version>4.0.4</client_OS_version>
    <client_app_type>web browser</client_app_type>
    <client_name>Mobile Safari</client_name>
    <client_version>534.30</client_version>
</client_details>
<client_details>//Mac Desktop with Webbrowser
    <client_IP>10.0.0.123</client_IP>
    <user_agent_string>Mozilla/5.0 (Macintosh; Intel Mac
        OS X 10_9_3) AppleWebKit/537.75.14 (KHTML,
        like Gecko) Version/7.0.3 Safari/537.75.14</user_
        agent_string>
    <client_product_type>MacPro5,1</client_product_
        type>
    <client_serial_number>YXXXXXXXXZ</client_se-
        rial_number>
    <client_UDID>FXXXXXXXXX-XXXX-XXXX-
        XXXX-XXXXXXXXXXXX</client_UDID>
    <client_OS>Mac OS X</client_OS>
    <client_OS_version>10.9.3</client_OS_version>
    <client_app_type>web browser</client_app_type>
    <client_name>Mobile Safari</client_name>
    <client_version>537.75.14</client_version>
</client_details>
<message>
    <message_identifier>ID_message_10</message_iden-
        tifier>
    <team_identifier>ID_team_1</team_identifier>
    <channel_identifier>ID_channel_1</channel_identi-
        fier>
    <body contents>That is an interesting invention. I have
        attached a copy our patent policy.</body contents>
    <attachments>patent_policy.pdf</attachments>
</message>
</auth_request>
```

The group-based communication system 200 comprises at least one group-based communication apparatus 205 that may create a storage message based upon the received messaging communication to facilitate message indexing and storage in a group-based communication repository 206. In one implementation, the storage message may include data such as a message identifier, a group identifier, a group-based communication channel identifier, a sending user identifier, topics, responses, message contents (i.e., message data), attachments, message hierarchy data, third party metadata, conversation primitive data, and/or the like. For example, the group-based communication apparatus 205 may provide the following example storage message, substantially in the form of a HTTP(S) POST message including XML-formatted data, as provided below:

```
POST /storage_message.php HTTP/1.1
Host: www.server.com
Content-Type: Application/XML
Content-Length: 667
<?XML version="1.0" encoding="UTF-8" ?>
<storage_message>
    <message_identifier>ID_message_10</message_iden-
        tifier>
    <team_identifier>ID_team_1</team_identifier>
    <channel_identifier>ID_channel_1</channel_identi-
        fier>
    <sending_user_identifier>ID_user_1</sending_use-
        r_identifier>
    <topics>
        <topic>disclosures</topic>
        <topic>patents</topic>
        <topic>policies</topic>
    </topics>
    <responses>
        <response>liked by ID_user_2</response>
        <response>starred by ID_user_3</response>
    </responses>
    <body contents>That is an interesting disclosure. I
        have attached a copy our patent policy.</body con-
        tents>
```

```
<attachments>patent_policy.pdf</attachments>
<conversation_primitive>
    conversation includes messages: ID_message_8,
        ID_message_9, ID_message_10, ID_message_11,
        ID_message_12
</conversation_primitive>
</storage_message>
```

In embodiments, a sending user identifier may be associated with the messaging communication. In one implementation, message metadata associated with the messaging communication may be parsed (e.g., using PHP—i.e., the script language derived from Personal Home Page Tools—commands) to determine a sending user identifier of the user who sent the message.

In embodiments, messaging communications may be parsed (e.g., using PHP commands) to determine topics discussed in the messaging communication. For example, hashtags in the message may indicate topics associated with the message. In another example, special characters (e.g., "@") may indicate a text object associated with a user identifier. In another example, the messaging communication may be analyzed (e.g., by itself, with other messaging communications in a conversation primitive) or parsed using a machine learning technique, such as topic modeling, to determine topics associated with the messaging communication.

In embodiments, data indicating responses may be associated with the messaging communication. For example, responses to the messaging communication by other users may include reactions (e.g., selection of a graphical object such as an emoji associated with the messaging communication, selection of a "like" button associated with the message), clicking on a hyperlink embedded in the messaging communication, replying to the messaging communication (e.g., posting a messaging communication to the group-based communication channel in response to the messaging communication), downloading a file associated with the messaging communication, sharing the messaging communication from one group-based communication channel to another group-based communication channel, pinning the messaging communication, starring the messaging communication, and/or the like. In one implementation, data regarding responses to the messaging communication by other users may be included with the messaging communication, and the messaging communication may be parsed (e.g., using PHP commands) to determine the responses. In another implementation, data regarding responses to the messaging communication may be retrieved from a database. For example, data regarding responses to the messaging communication may be retrieved via a MySQL database command similar to the following:

SELECT messageResponses
FROM MSM_Message
WHERE messageID=ID_message_10.

For example, data regarding responses to the messaging communication may be used to determine context for the messaging communication (e.g., a social score for the messaging communication from the perspective of some user). In another example, data regarding responses to the messaging communication may be analyzed to determine context regarding the user (e.g., the user's expertise in a topic may be determined based on the responses to the user's messaging communication regarding the topic).

In embodiments, attachments may be included with the messaging communication. If there are attachments, files may be associated with the messaging communication. In one implementation, the messaging communication may be parsed (e.g., using PHP commands) to determine file names of the attachments. For example, file contents may be analyzed to determine context for the messaging communication (e.g., a patent policy document may indicate that the messaging communication is associated with the topic "patents").

In embodiments, message metadata may be associated with the messaging communication. For example, message metadata may provide additional context regarding the messaging communication or the user that is specific to a company, group, a group-based communication workspace, a group-based communication channel, and/or the like. In one implementation, the messaging communication may be parsed (e.g., using PHP commands) to determine message metadata. For example, message metadata may indicate whether the user who sent the messaging communication is an authorized representative of the group-based communication channel (e.g., an authorized representative may be authorized by the company to respond to questions in the group-based communication channel).

In embodiments, a conversation primitive may be associated with the messaging communication. In one implementation, a conversation primitive is an element used to analyze, store, and/or the like messaging communications. For example, the messaging communication may be analyzed by itself, and may form its own conversation primitive. In another example, the messaging communication may be analyzed along with other messaging communications that make up a conversation, and the messaging communications that make up the conversation may form a conversation primitive. In one implementation, the conversation primitive may be determined as the messaging communication, a specified number (e.g., two) of preceding messaging communications and a specified number (e.g., two) of following messaging communications. In another implementation, the conversation primitive may be determined based on analysis of topics discussed in the messaging communication and other messaging communications (e.g., in the group-based communication channel) and/or proximity (e.g., messaging communication send order proximity, messaging communication send time proximity) of these messages.

Example Apparatus for Implementing Embodiments of the Present Disclosure

Figure 2:
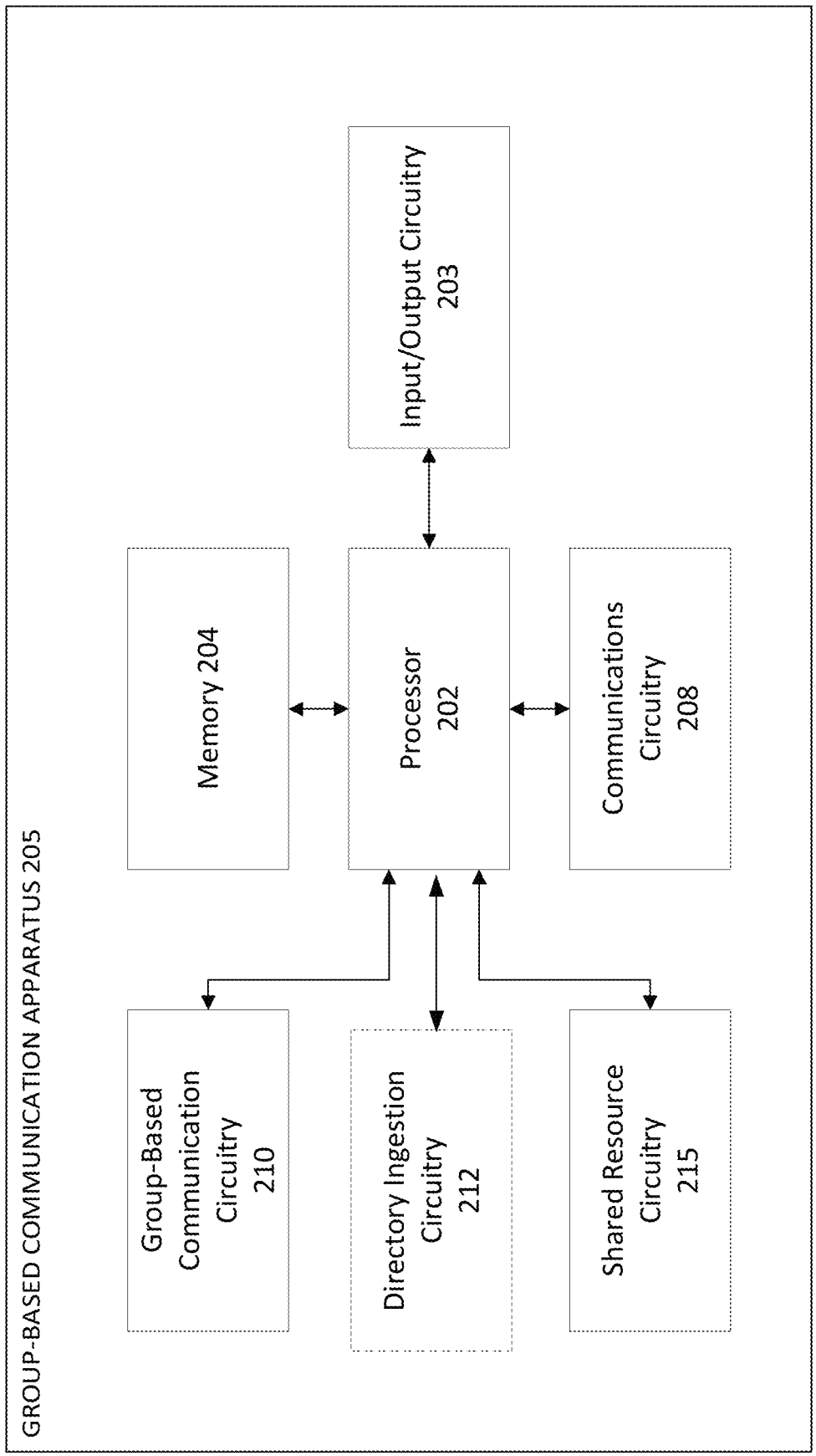
FIG. 2 shows a schematic view of a group-based communication apparatus configured according to one embodiment.

The group-based communication apparatus 205 may be embodied by one or more computing systems, such as group-based communication apparatus 205 shown in FIG. 2. The group-based communication apparatus 205 may include a processor 202, a memory 204, input/output circuitry 203, communications circuitry 208, group-based communication circuitry 210, directory ingestion circuitry 212, and shared resource circuitry 215. The apparatus 205 may be configured, using one or more of the circuitry 203, 208, 210, 212, and 215, to execute the operations described herein.

Although the components are described with respect to functional limitations, it should be understood that the particular implementations necessarily include the use of particular hardware. It should also be understood that certain components of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 205 may provide or supplement the functionality of particular circuitry. For example, the processor 202 may provide processing functionality, the memory 204 may provide storage functionality, the communications circuitry 208 may provide network interface functionality, and the like.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the group-based communication apparatus 205 to carry out various functions in accordance with example embodiments of the present disclosure.

The processor 202 may be embodied in a number of different ways and may, for example, include one or more processing devices configured to perform independently. Additionally, or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

As just one example, the processor 202 may be configured to maintain one or more communication channels connecting a plurality of client devices 108 (shown in FIG. 1) to enable messaging communication sharing therebetween. The processor 202 ensures that messaging communications intended for exchange between the client devices 108 within the particular communication channel are properly disseminated to those client devices 108 for display within respective message panes provided via the client devices 108.

Moreover, the processor 202 may be configured to synchronize messaging communications exchanged on a particular communication channel with a database for storage of messages therein. In certain embodiments, the processor 202 may provide stored messages for dissemination to client devices 108. The processor 202 may also provide to distribute such stored messages across various group-based communication workspaces and associated group-based communication channels as discussed herein.

In some embodiments, the group-based communication apparatus 205 may include input/output circuitry 203 that may, in turn, be in communication with processor 202 to provide output to the user and, in some embodiments, to receive an indication of a user input. The input/output circuitry 203 may comprise a user interface (e.g., a group-based communication interface) and may include a display and may comprise a web user interface, a mobile application, a client device, a kiosk, or the like. In some embodiments, the input/output circuitry 203 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the group-based communication apparatus 205. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s).

The group-based communication circuitry 210 includes hardware and software configured to support a group-based communication system 200. The group-based communication circuitry 210 may utilize processing circuitry, such as the processor 202, to perform these actions. The group-based communication circuitry 210 may send and/or receive data from group-based communication repository 206. In some implementations, the sent and/or received data may be group-based communication objects (e.g., messages, files, links, etc.) organized among a plurality of group-based communication channels. It should also be appreciated that, in some embodiments, the group-based communication circuitry 210 may include a separate processor, specially configured field programmable gate array (FPGA), or application specific interface circuit (ASIC).

The shared resource circuitry 215 includes hardware and software configured to support group-based communication resource sharing related functionality, features, and/or services of the group-based communication system 200. The shared resource circuitry 215 may utilize processing circuitry, such as the processor 202, to perform these actions. The directory ingestion circuitry 212 may send and/or receive data from client devices 108. In some implementations, the sent and/or received data may comprise an external user directory corpus that is configured for association with one or more group-based communication workspaces and/or user identifiers. It should also be appreciated that, in some embodiments, the shared resource circuitry 215 and/or directory ingestion circuitry 212 may each include a separate processor, specially configured field programmable gate array (FPGA), or application specific interface circuit (ASIC).

It is also noted that all or some of the information discussed herein can be based on data that is received, generated and/or maintained by one or more components of the group-based communication apparatus 205. In some embodiments, one or more external systems (such as a remote cloud computing and/or data storage system, one or more external messaging resources 118, one or more external approval provisioning services 110, and/or the like) may also be leveraged to provide at least some of the functionality discussed herein.

As described above and as will be appreciated based on this disclosure, embodiments of the present disclosure may be configured as methods, mobile devices, frontend graphical user interfaces, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

As will be appreciated, any such computer program instructions and/or other type of code may be loaded onto a computer, processor or other programmable apparatus's circuitry to produce a machine, such that the computer, processor, or other programmable circuitry that execute the code on the machine creates the means for implementing various functions, including those described herein.

The computing systems described herein can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any inventions or of what may be claimed, but rather as description of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Any operational step shown in broken lines in one or more flow diagrams illustrated herein are optional for purposes of the depicted embodiment.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

Example Processes for Managing External Approval Provisioning

Figure 3A:
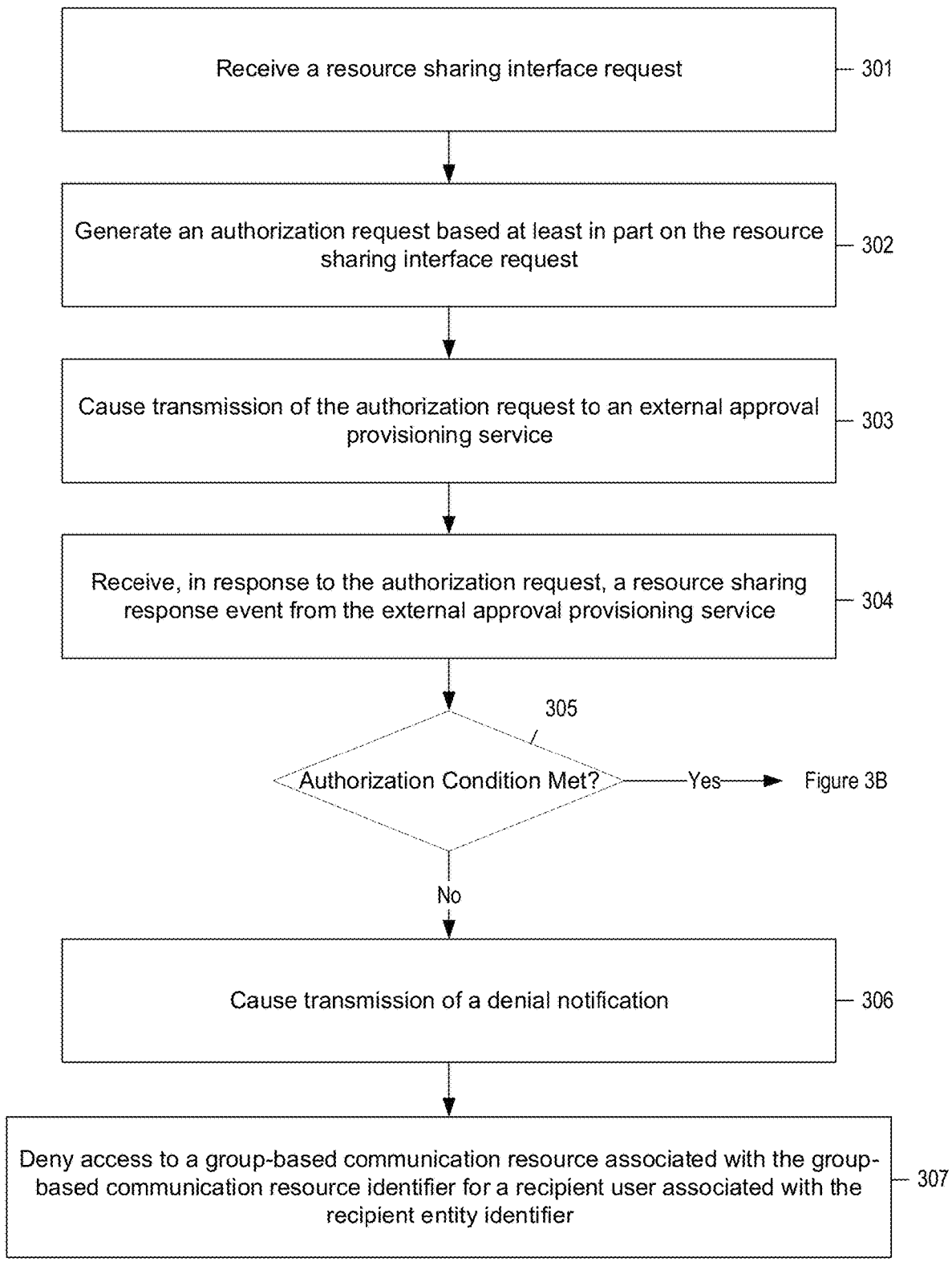
FIG. 3A is a flowchart illustrating steps for managing resource sharing authorizations in a group-based communication system using an external approval provisioning service in accordance with one embodiment.

In embodiments, the group-based communication apparatus 205 is configured to manage external approval provisioning with an external approval provisioning service in accordance with operations of the method 300A illustrated in FIG. 3A.

The depicted process begins at operation 301 wherein the group-based communication apparatus 205 receives a resource sharing interface request. The group-based communication apparatus 205 may receive, from a client device 108 associated with a sending user identifier, the resource sharing interface request via communications circuitry 208 and/or communications network 112. In one embodiment, the resource sharing interface request may be received upon a user at the client device 108 interacting with one or more graphical user interface elements of a group-based communication interface. For example, a group-based communication interface rendered at the client device 108 may comprise one or more user interface elements associated with causing transmission of a resource sharing interface request.

Turning to the above example, a user of a group-based communication system and an employee of Acme Corp., Adrian, may need to exchange messages and/or otherwise collaborate with users Lisa of Beta Brands and Thomas of Global Logistics and may wish to do so in an externally shared group-based communication channel called #wholesale-strategy. In this regard, Adrian may desire to invite Lisa and Thomas to the #wholesale-strategy channel in order for Lisa and Thomas to access content within the group-based communication channel and communicate with other members of the team.

Figure 3B:
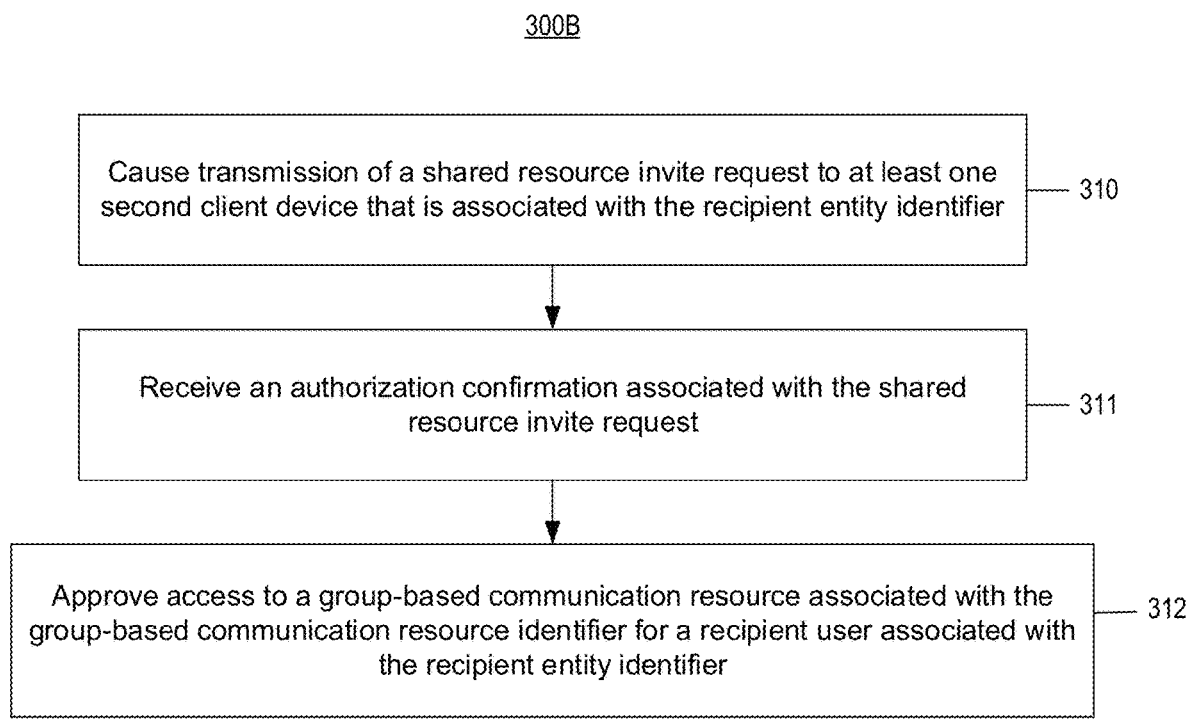
FIG. 3B is a flowchart illustrating steps for confirming authorization of a shared resource invite request by a client device associated with a recipient entity identifier in accordance with one embodiment.
Figure 3C:
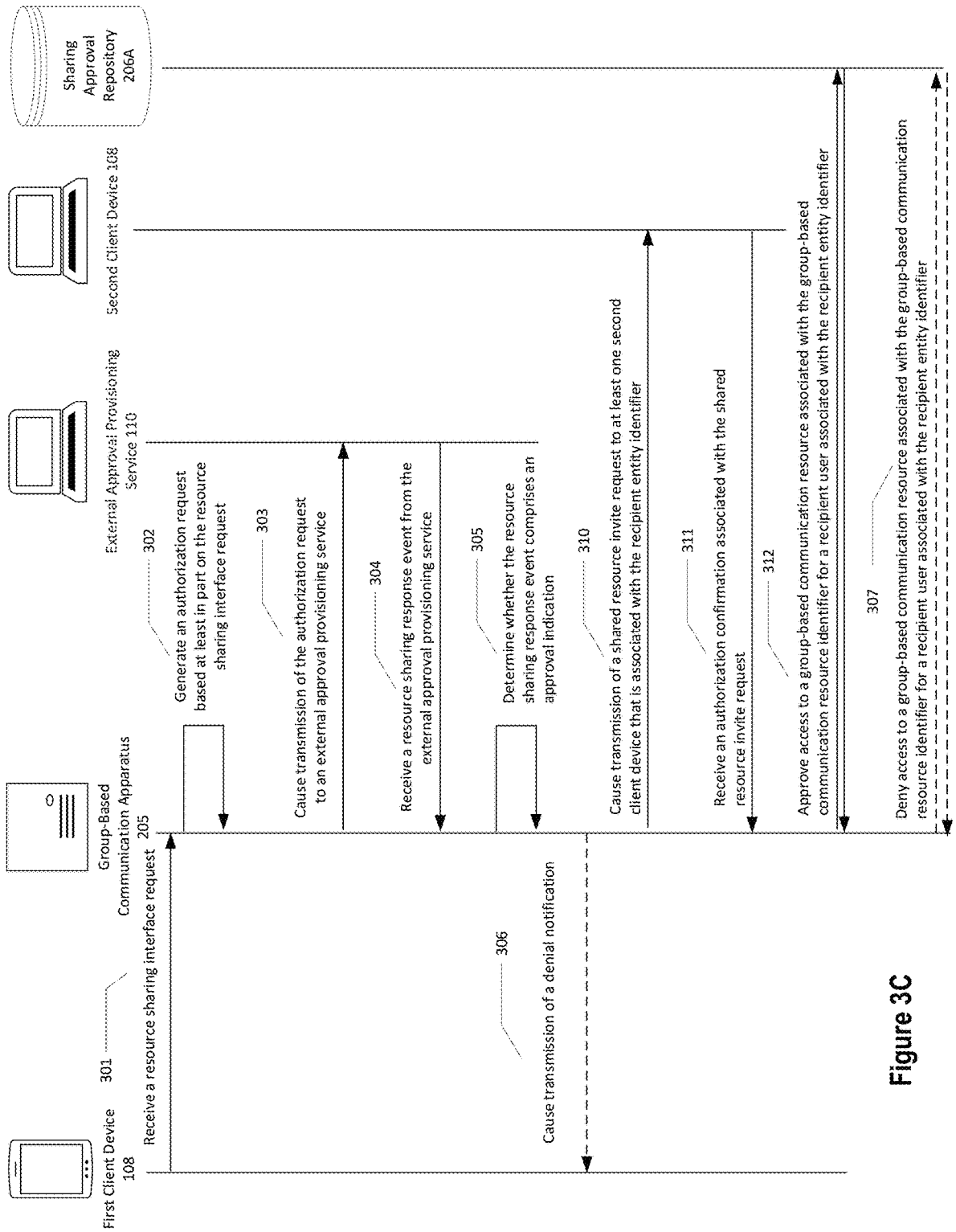
FIG. 3C is a signal diagram of an example data flow illustrating steps for managing resource sharing authorizations in a group-based communication system using an external approval provisioning service in accordance with one embodiment.
Figure 3D:
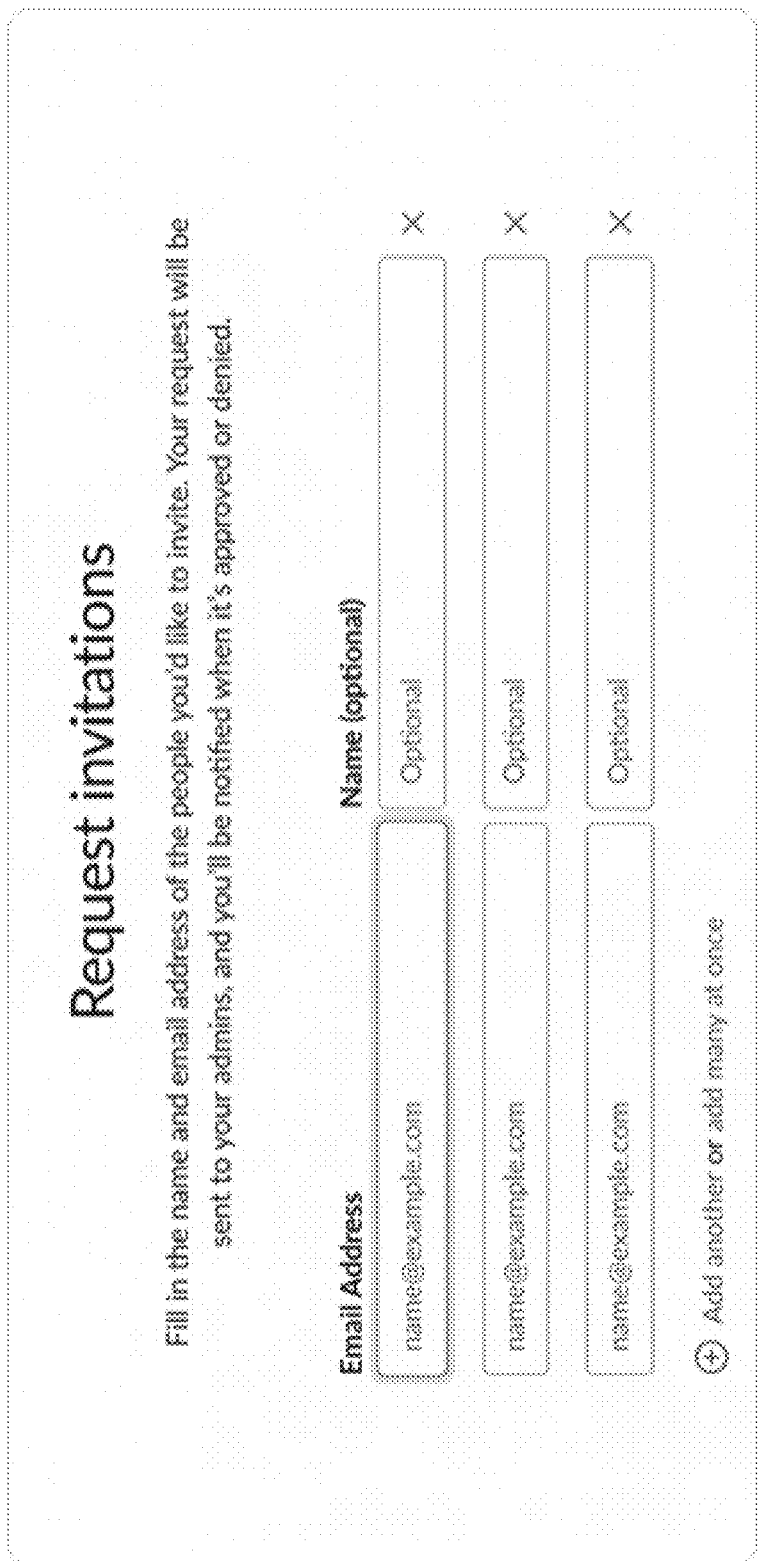
FIG. 3D shows an example interface associated with generating a resource sharing interface request configured in accordance with one embodiment.

FIG. 3D illustrates an example user interface in which Adrian may cause generation of a resource sharing interface request. The user interface illustrated in FIG. 3D may be rendered by the group-based communication apparatus to a client device associated with Adrian. Adrian may then enter Thomas and Lisa's email addresses and subsequently engage a user interface element associated with causing transmission of a resource sharing interface request (e.g., a "send" button and/or the like).

The resource sharing interface request may comprise metadata. For example, the resource sharing interface request may comprise metadata including a sending user identifier (e.g., a user identifier of a user that initiated the resource sharing interface request, or Adrian in this example), a recipient entity identifier of a user or organization the sending user intends to share a group-based communication resource with (e.g., Thomas and/or Lisa's user identifier), and a group-based communication resource identifier associated with a particular group-based communication resource that the user intends to share (e.g., a group-based communication channel identifier associated with the #wholesale-strategy channel).

In some embodiments, the recipient entity identifier may be a recipient user identifier. In other words, the recipient entity identifier may be associated with a particular user (Thomas and/or Lisa) of the group-based communication system that Adrian intends to share the group-based communication resource with. In some embodiments, the recipient entity identifier may be a recipient organization identifier associated with a particular recipient organization (e.g., Beta Brands and/or Global Logistics) that Adrian intends to share the group-based communication resource with. In this regard, in some examples, Adrian may be requesting to share the #wholesale-strategy channel with a plurality of users associated with Beta Brands and/or Global Logistics.

For example, in an instance in which the sending user intends to share a group-based communication channel with the user or organization associated with the recipient entity identifier, the group-based communication resource identifier of the resource sharing interface request may be a group-based communication channel identifier. For instance, continuing with the above example, the sending user identifier may be a user identifier associated with Adrian, the recipient entity identifier may be a user identifier associated with Lisa and/or Thomas, and the group-based communication resource identifier may be a group-based communication channel identifier associated with the #wholesale-strategy group-based communication channel. As another example, if the resource sharing interface request is associated with sharing a group-based communication workspace, the associated group-based communication resource identifier may be a group-based communication workspace identifier. In this regard, the group-based communication apparatus 205 is configured to receive, from a client device associated with a sending user identifier and via communications circuitry, a resource sharing interface request.

As another example, if the resource sharing interface request is associated with sharing a group-based communication file, the associated group-based communication resource identifier may be associated with a group-based communication file. For example, the group-based communication file may be a file (e.g., a text file, video file, image file, and/or the like) previously communicated to (e.g., via a messaging communication) and/or stored in the group-based communication system (e.g., in group-based communication repository 206).

At operation 302, in response to receiving the resource sharing interface request, the group-based communication apparatus 205 may generate an authorization request. The authorization request may be based at least in part on the resource sharing interface request. For example, the authorization request may comprise the group-based communication resource identifier and the recipient entity identifier of the resource sharing interface request. Continuing with the above example, the example authorization request would include a group-based communication channel identifier for the #wholesale-strategy channel and user identifiers for Lisa and Thomas. In this regard, the group-based communication apparatus 205, such as the processor 202, shared resource circuitry 215, and/or the like is configured to generate an authorization request based at least in part on the resource sharing interface request.

In some embodiments, the authorization request may further comprise a request type identifier that corresponds to one of a single resource request, a multi-resource request, a guest access request, or a full member request. For example, a single resource request may indicate that the resource sharing interface request is associated with a single group-based communication resource identifier to be shared with the recipient entity identifier. In the above example, Adrian's request is a single resource request as he is only sharing one resource, the #wholesale-strategy channel. A multi-resource request may indicate that the resource sharing interface request is associated with more than one group-based communication resource identifier to be shared with the recipient entity identifier(s). A guest member request may indicate that the resource sharing interface request is associated with a limited amount group-based communication resources associated with the group-based communication workspace identifier, such that the recipient entity identifier is to have access to only select group-based communication resources associated with the group-based communication workspace. For example, a guest member may have access to the group-based communication workspace, however may only have access to a select handful of group-based communication channels, may be unable to access group-based communication files associated with the group-based communication workspace, and/or the like. A full member request may indicate that the resource sharing interface request is associated with all group-based communication resources associated with the group-based communication workspace identifier, such that the recipient entity identifier is to have access to all group-based communication resources associated with the group-based communication workspace.

In an embodiment and as defined above, the authorization request may be provided to an external approval provisioning service 110. At operation 303, the group-based communication apparatus 205, such as the processor 202, communications circuitry 208, and/or the like, is configured to cause transmission of the authorization request to an external approval provisioning service. For example, the authorization request may be transmitted to the external approval provisioning service 110 using one or more commands associated with an external approval API 115.

In some embodiments, the authorization request may be used by an external approval provisioning service 110 to render data associated with the authorization request for admin user review.

In some embodiments, one or more admin users of admin client devices 109 may review data associated with the authorization request through use of the external approval provisioning service. In this regard, Acme Corp. admin user, Adam, may review Adrian's request to invite Lisa and Thomas to #wholesale-strategy. As described above, admin users such as Adam may utilize the external approval provisioning service (e.g., as software running on an admin client device) to provide invitation approval, access credential management, and/or other enterprise software process management services. In this regard, one or more admin users may utilize the external approval provisioning service to approve or deny the authorization request associated with the resource sharing interface request received at the external approval provisioning service 110 through external approval API 115.

In some embodiments, the one or more admin users reviewing the authorization request may be one or more admin users associated with the group-based communication resource identifier of the authorization request. For example, in an instance in which the group-based communication resource identifier of the authorization request is a group-based communication channel identifier, the admin users authorized to approve or deny the authorization request associated with the resource sharing interface request may only be admin users associated with the group-based communication channel identified by the group-based communication channel identifier. In the above example, Adam of Acme Corporation is an admin user associated with Acme's workspace, the workspace in which Adrian is attempting to externally share #wholesale-strategy with Lisa and Thomas.

At operation 304, the group-based communication apparatus 205, such as the processor 202, communications circuitry 208, and/or the like, is configured to receive, in response to the authorization interface request, a resource sharing response event from the external approval provisioning service. In this regard, the group-based communication apparatus 205 may be configured to listen for a resource sharing response event received through external approval API 115.

As described above, the resource sharing response event may be generated at the external approval provisioning service 110 and transmitted to the group-based communication apparatus 205 via the external approval API 115. In some embodiments, the resource sharing response event may comprise an indication of whether or not the one or more admin users (e.g., Adam) who reviewed the authorization request associated with the resource sharing interface request approve the authorization request. In this regard, in some embodiments, the resource sharing response event may comprise an approval indication associated with the resource sharing interface request which may indicate Adam's approval of the resource sharing interface request generated by Adrian. Alternatively, in some embodiments, the resource sharing response may comprise a denial indication associated with the resource sharing interface request which may indicate Adam's denial of Adrian's resource sharing interface request.

In this regard, upon receiving the resource sharing response event, at decision block 305, the group-based communication apparatus 205, such as the processor 202, shared resource circuitry 215, and/or the like, is configured to analyze the resource sharing response event to determine whether an authorization condition has been met. In this regard, the group-based communication apparatus 205 may analyze the resource sharing response event and determine if the resource sharing response event comprises an approval indication or a denial indication associated with the resource sharing interface request.

For example, in an instance in which the authorization condition has not been met (e.g., the resource sharing response event comprises a denial indication associated with the resource sharing interface request), at operation 306, the group-based communication apparatus 205, such as the processor 202, shared resource circuitry 215, and/or the like, is configured to cause transmission of a denial notification. The denial notification may be caused to be transmitted to a client device associated with the sending user identifier associated with the resource sharing interface request, or in other words, the client device at which the resource sharing interface request originated from. In the above example, the denial notification is transmitted to Adrian's client device.

In some embodiments, data associated with the denial notification may be rendered to a group-based communication interface at the client device associated with the sending user identifier associated with the resource sharing interface request (e.g., Adrian's device). In this regard, Adrian may be notified that one or more admin users have denied the resource sharing interface request, and that sharing of the group-based communication resource with Lisa and Thomas, at least in the particular instance, is not authorized.

At operation 307, the group-based communication apparatus 205 may deny access to a group-based communication resource associated with the group-based communication resource identifier for a recipient user associated with the recipient entity identifier. In some embodiments, denying access to the group-based communication resource may comprise updating a sharing approval repository 206A to add a sharing denial indication associated with the recipient entity identifier and the group-based communication resource identifier. In this regard, the group-based communication apparatus 205, such as the processor 202, shared resource circuitry 215, and/or the like, is configured to update a sharing approval repository to add a sharing denial indication associated with the recipient entity identifier and the group-based communication resource identifier. As described above, the sharing approval repository may be a table that is configured for storing sharing approval indications and sharing denial indications correlated to specific user identifiers and/or organization identifiers for each group-based communication resource. For example, a sharing denial indication associated with the Thomas and Lisa's user identifiers and the group-based communication channel identifier associated with #wholesale-strategy is stored in sharing approval repository 206A.

In an instance in which the resource sharing response event comprises an approval indication associated with the resource sharing interface request (e.g., Adam approves Adrian's request), the group-based communication apparatus 205 may be configured to carry out operations 310-312 in method 300B of FIG. 3B.

In some embodiments, in response to determining the resource sharing response comprises a sharing approval indication, at operation 310, the group-based communication apparatus 205, such as the processor 202, communications circuitry 208, and/or the like, is configured to cause transmission of a shared resource invite request. The shared resource invite request may be transmitted to at least one second client device that is associated with the recipient entity identifier. In this regard, users at one or more second client devices whom the group-based communication resource is intended to be shared with (e.g., Lisa and Thomas in the above example) may receive and view the shared resource invite request. In this regard, data associated with the shared resource invite request may be rendered to a group-based communication interface associated with the one or more second client devices. The group-based communication apparatus 205 may be configured to cause rendering of data associated with the shared resource invite request at the second client device. In some embodiments, the rendering of data associated with the shared resource invite request may comprise rendering of one or more user interface elements associated with approving and/or denying the shared resource invite request.

In some embodiments Lisa and/or Thomas may then engage with the shared resource invite request by approving or denying the shared resource invite request (e.g., Adrian's invitation to join #wholesale-strategy), such as, for example, by engaging with one or more user interface elements associated with the shared resource invite request.

At operation 311, the group-based communication apparatus 205, such as the processor 202, communications circuitry 208, and/or the like, is configured to receive an authorization confirmation associated with the shared resource invite request. The authorization confirmation associated with the shared resource invite request may be generated at the second client device 108 (for example, Thomas and or Lisa's device) and caused to be transmitted to the group-based communication apparatus 205 upon a user engaging with a user interface element associated with an approval of the shared resource invite request. In the above example, the authorization confirmation may be transmitted once Lisa and/or Thomas accept the invitation.

In response to receiving the authorization confirmation associated with the shared resource invite request from the at least one second client device, at operation 312, the group-based communication apparatus may approve access to a group-based communication resource associated with the group-based communication resource identifier for a recipient user associated with the recipient entity identifier. In other words, access for Lisa and Thomas to join the #wholesale-strategy channel may be approved. In some embodiments, approving access to the group-based communication resource may comprise providing a notification of the approval to the recipient entity user(s) (e.g., Thomas and Lisa), providing a notification of the approval to the admin user that provided the authorization confirmation (e.g., Adam), and/or providing a notification of the approval to the sending user (e.g., Adrian). In some embodiments, in response to receiving the authorization confirmation associated with the shared resource invite request and/or upon approval of access to the group-based communication resource, the group-based communication apparatus may be configured to update a sharing approval repository to add a sharing approval indication associated with the recipient entity identifier and the group-based communication resource identifier. In this regard, the group-based communication apparatus 205, such as the processor 202, shared resource circuitry 215, and/or the like, is configured to update a sharing approval repository to add a sharing approval indication associated with the recipient entity identifier and the group-based communication resource identifier. As described above, the sharing approval repository may be a table that is configured for storing sharing approval indications correlated to specific user identifiers and/or organization identifiers for each group-based communication resource. In some embodiments, once the sharing approval repository is updated to include the sharing approval indication associated with the recipient entity identifier and the group-based communication resource identifier, the group-based communication resource associated with the group-based communication resource identifier may be accessible to the second client device associated with the recipient entity identifier. For example, in an embodiment in which the group-based communication resource identifier comprises a group-based communication channel identifier, the second client device may access and engage with the group-based communication channel associated with the group-based communication channel identifier.

In some embodiments, in addition to storing a sharing approval indication, the group-based communication apparatus 205 may be configured to store additional information associated with the shared resource invite request. For example, data associated with the shared resource invite request such as the recipient entity identifier, one or more sending user identifiers, an email address associated with the recipient entity identifier, a member type for the recipient entity identifier, a reason for the shared resource invite request, an access level (e.g., channel-level access or workspace-level access), an admin user identifier of the admin user that initiated the authorization confirmation, and/or a timestamp indicative of the time of approval may be stored in association with the sharing approval indication in the sharing approval repository 206A.

FIG. 3C is a signal diagram of an example data flow represented by operations described above and illustrated in FIGS. 3A and 3B. Methods 300A and 300B are described as being performed by at least two client devices 108 (e.g., a first client device and a second client device), a group-based communication apparatus 205, an external approval provisioning service 110, and sharing approval repository 206A. These devices may be similar to those previously described above with regards to FIG. 1.

Example Processes for Managing External User Communication and Onboarding

Figure 4A:
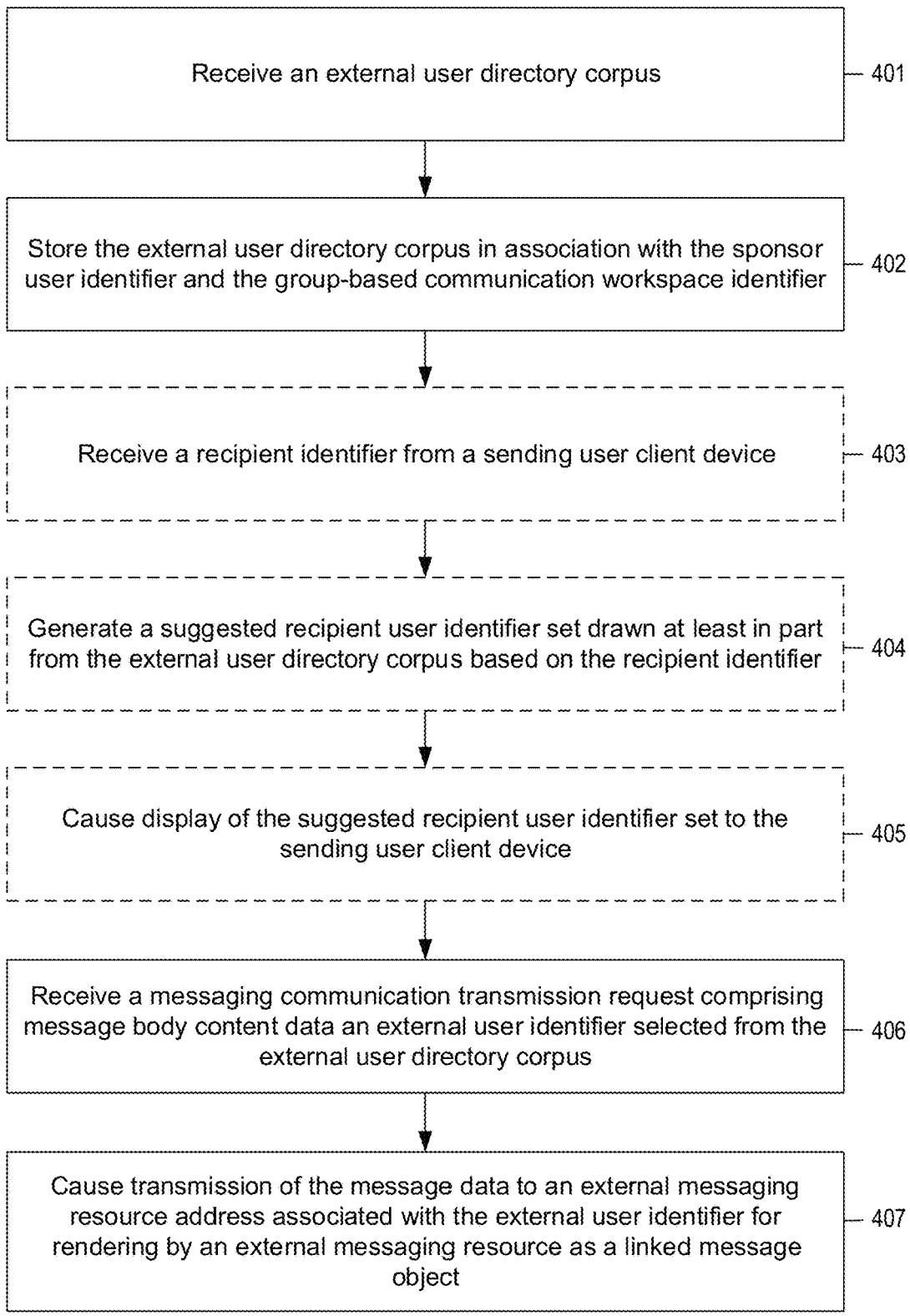
FIG. 4A is a flowchart illustrating steps for ingesting an external user directory corpus and managing messaging communications involving an external messaging resource in accordance with one embodiment.
Figure 5A:
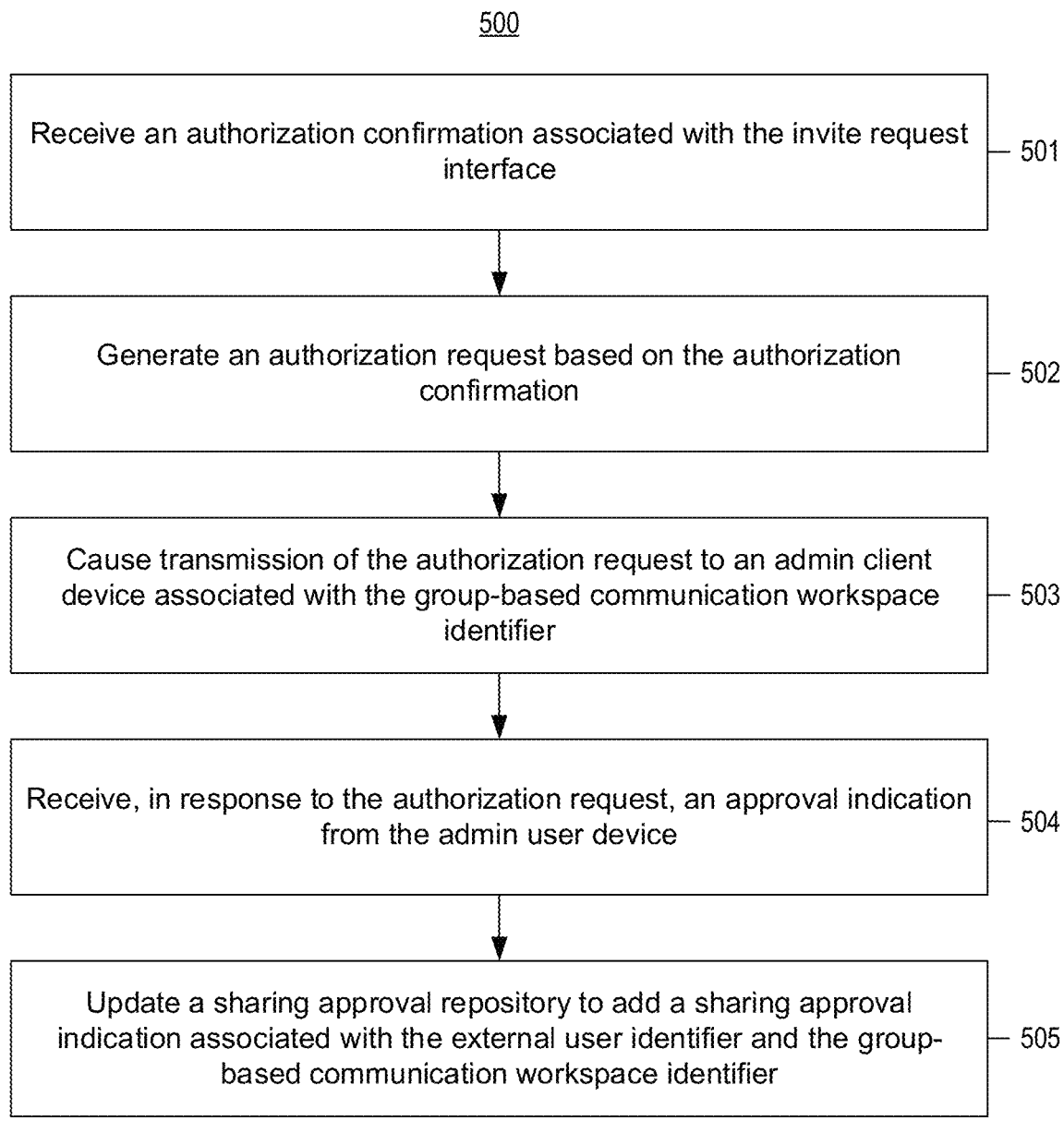
FIG. 5A is a flowchart illustrating steps for managing a new member onboarding protocol associated with an invite request interface configured in accordance with one embodiment.

In embodiments, the group-based communication apparatus 205 is configured to enable users of a group-based communication system to initiate communication with persons unaffiliated with the group-based communication system and to efficiently cause initiation of a new member onboarding protocol for the unaffiliated persons in accordance with operations of methods 400 and 500 illustrated in FIGS. 4A and 5A.

The depicted method 400 begins at operation 401 of FIG. 4A wherein the group-based communication apparatus 205, such as the processor 202, communications circuitry 208, directory ingestion circuitry 212, and/or the like, is configured to receive an external user directory corpus from a first client device.

For example, Adrian, a user at the first client device, may initiate an ingestion process associated with the group-based communication system 200 wherein a plurality of external user data objects (e.g., Adrian's contacts) may be ingested and/or imported into the group-based communication system from the client device, in some embodiments having originated from one or more external sources, such as one or more external messaging resources 118. For example, the external user data objects may comprise data associated with contact information of one or more persons associated with Adrian. As one example, Adrian may utilize software and/or other services external to the group-based communication system, such as an email application, calendar application, and/or the like, which is configured to store a plurality of contact information associated with contacts (e.g., friends, family, colleagues, and/or the like) of Adrian at his client device. In this regard, the contact information for Adrian may be ingested and/or imported into the group-based communication system as a plurality of external user data objects from Adrian's client device.

Each external user data object may comprise contact information associated with a particular entity. For example, an external user data object may comprise one or more external messaging resource addresses, such as one or more email addresses, one or more telephone numbers, text comprising a name and/or username associated with the external user, and/or other similar data.

In some embodiments, an external user directory corpus received from the first client device may be associated with a sponsor user identifier and a group-based communication workspace identifier. For example, the sponsor user identifier may identify a user identifier associated with the user who initiated the ingestion process and/or is otherwise associated with the plurality of external user data objects in the external user directory corpus (e.g., Adrian). The group-based communication workspace identifier associated with the external user directory corpus may identify a particular group-based communication workspace that Adrian is associated with and the external user directory corpus is to be associated with. As an example, the group-based communication workspace may be Acme Corporation's workspace.

In some embodiments, the external user directory corpus may further be associated with a first domain. For example, the first domain associated with the external user directory corpus may be a particular domain associated with the first client device and/or the group-based communication workspace identifier. For example, the user at the first client device may be associated with a particular domain based on the organization the user is associated with. In Adrian's example, the domain may be "acme-corp.com". In this regard, Adrian, as well as all members of the group-based communication workspace may all be associated with the same domain and/or a domain associated with the first domain. In some examples, the domain may refer to an email domain. In this regard, in some embodiments, the external user directory corpus may only comprise email addresses associated with the same domain (e.g., email addresses ending in @acme-corp.com or a variant thereof, such as @us.acme-corp.com, @cn.acme-corp.com, or the like).

At operation 402, the group-based communication apparatus 205, such as the processor 202, memory 204, and/or the like, is configured to store the external user directory corpus in association with the sponsor user identifier and the group-based communication workspace identifier. For example, in an embodiment, the group-based communication apparatus 205 may store the external user directory corpus in the group-based communication repository 206 in association with Adrian's user identifier and Acme Corporation's workspace identifier. Upon storing of the external user directory corpus, data associated with the external user directory corpus may be made accessible to one or more additional members of the group-based communication workspace associated with group-based communication workspace identifier which the external user directory corpus is stored in association with (e.g., Acme Corporation's workspace), as described further herein.

In some embodiments, at operation 403, the group-based communication apparatus 205, such as the processor 202, communications circuitry 208, and/or the like, is configured to receive a recipient identifier from a sending user client device. In some embodiments, the recipient identifier may be received from a sending user client device associated with the group-based communication workspace identifier. In this regard, a user at the sending user device may also be a member of the group-based communication workspace identified by the group-based communication workspace identifier that the external user directory corpus is stored in association with. In some embodiments, the sending user client device may be the first client device from which the external user directory corpus was received from (e.g., in operation 401). In this regard, the recipient identifier may be received from Adrian's device.

In some embodiments, the recipient identifier may be generated based on user input associated with a messaging communication input interface rendered to a group-based communication interface displayed at the sending user client device. In this regard, Adrian may provide user input, such as text or the like, to the messaging communication input interface when attempting to locate contact information for Francis. The recipient identifier may comprise data associated with the user input, such as the text input by the user and/or the like. In one embodiment, the user input is a recipient identifier such as a text string such as "Fr."

In some embodiments, the group-based communication apparatus 205 may be configured to query a user directory including the external user directory corpus based on the recipient identifier. In this regard, the group-based communication apparatus 205 access the group-based communication repository 206 and retrieve data associated with an external user directory corpus associated with the group-based communication workspace identifier. As one example, the recipient identifier may comprise Adrian's user input in the form of the text "Fr." In this example, the retrieved data associated with an external user directory corpus associated with the group-based communication workspace identifier, and in some embodiments with the first domain, may comprise indications of directory user data objects of the external user directory corpus that comprise a name and/or external messaging resource address comprising the text "Fr." Additionally, in some embodiments, based on the directory query, the group-based communication apparatus 205 may be configured to access the group-based communication repository 206 and retrieve data associated with a member list associated with the group-based communication workspace identifier. In the above example, the member list may be a member list comprising members of the Acme Corporation workspace.

At operation 404, in some embodiments, the group-based communication apparatus 205, such as the processor 202, group-based communication circuitry 210, and/or the like, is configured to generate a suggested recipient user identifier set drawn at least in part from the external user directory corpus based on the recipient identifier. In some embodiments, the suggested recipient user identifier set may be generated in response to receiving the messaging communication request.

For example, based on the group-based communication workspace identifier and, in some embodiments, the first domain of the messaging communication request, the group-based communication apparatus 205 may be configured to access the group-based communication repository 206 and retrieve data associated with an external user directory corpus associated with the first domain and the group-based communication workspace identifier. In this regard, the suggested recipient user identifier set may comprise indications of all external user data objects of the external user directory corpus associated with the first domain and the group-based communication workspace identifier. Additionally, in some embodiments, the group-based communication apparatus 205 may be configured to access the group-based communication repository 206 and retrieve data associated with a member list associated with the group-based communication workspace identifier. In this regard, the suggested recipient user identifier set may comprise indications of all user identifiers associated with the group-based communication workspace identifier.

In some embodiments, at operation 405, the group-based communication apparatus 205, such as the processor 202, communications circuitry 208, and/or the like, is configured to cause display of the suggested external recipient user identifier set to the sending user client device. In this regard, data associated with the suggested external recipient user identifier set may be displayed to a group-based communication interface at Adrian's device for review and/or selection by Adrian.

Figure 6:
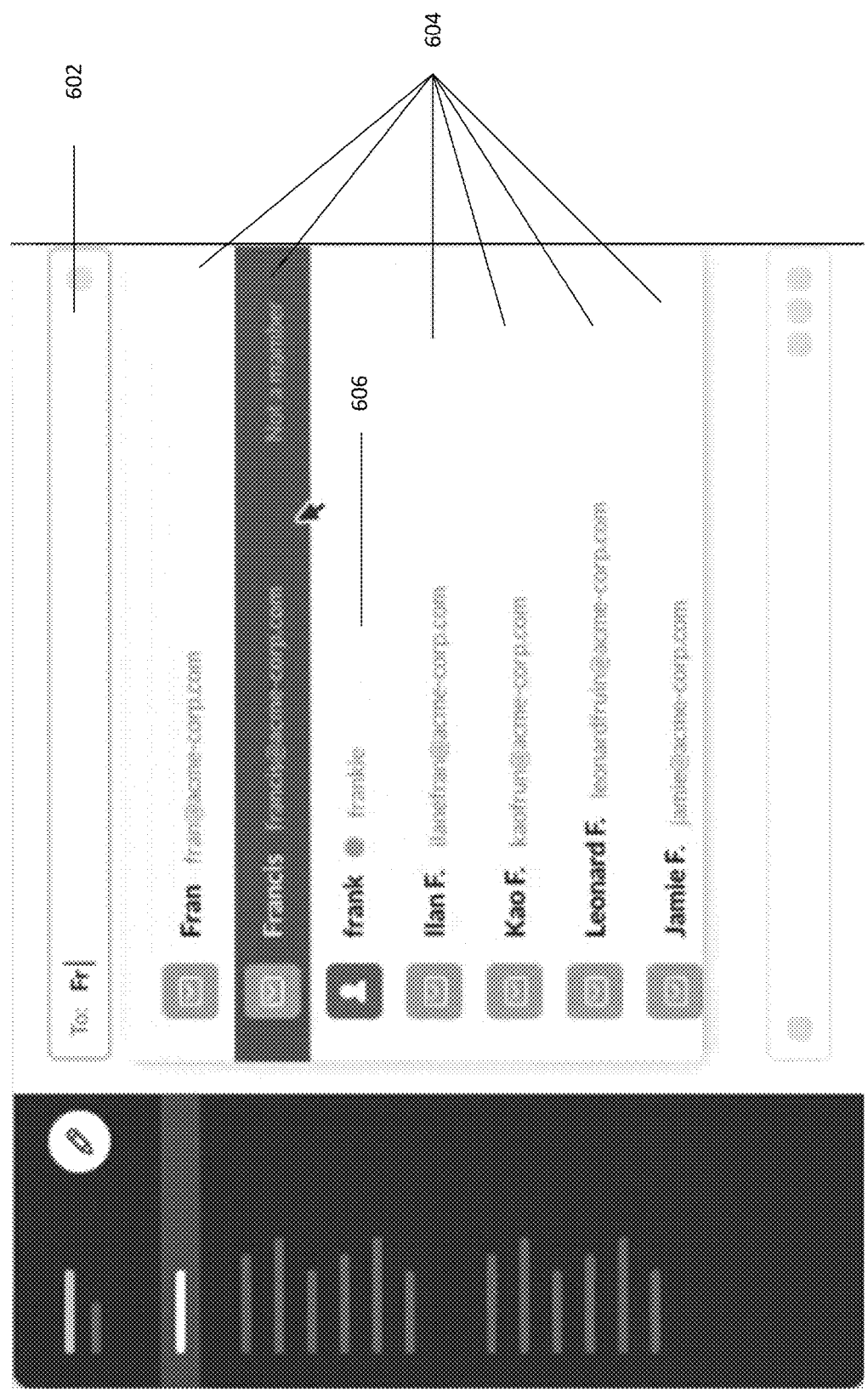
FIG. 6 shows an example suggested recipient user identifier set generated based on a recipient identifier associated with a messaging communication input interface configured in accordance with one embodiment.

As an example, FIG. 6 shows an example suggested recipient user identifier set displayed to Adrian's device in response to a recipient identifier generated based on Adrian's user input of "Fr" associated with a direct messaging input interface configured in accordance with one embodiment. For example, upon Adrian engaging with a direct messaging input interface element 602 (e.g., displayed as a text input box) and providing user input in the form of the text "Fr," a recipient identifier may be generated and the group-based communication apparatus 205 may be configured to query a user directory by accessing the group-based communication repository 206 and retrieve data associated with an external user directory corpus associated with the group-based communication workspace identifier and additionally retrieve data associated with a member list associated with the group-based communication workspace identifier. The retrieved data associated with the external user directory corpus associated with the group-based communication workspace identifier may comprise indications of directory user data objects 604 of the external user directory corpus that comprise a name and/or external messaging resource address comprising the text "Fr." Similarly, the retrieved data associated with the member list associated with the group-based communication workspace identifier may comprise indications of members of the Acme Corporation workspace (e.g., user identifiers) that comprise a name and/or email address comprising the text "Fr."

In other words, in addition to retrieving data associated with an external user directory corpus associated with the group-based communication workspace identifier, additional data may be retrieved based on the user input. For example, user identifiers associated with the group-based communication workspace (e.g., Acme Corporation's workspace) may also be retrieved. In this regard, users of the group-based communication system that are already members of the Acme Corporation workspace may also be included in the suggested recipient user identifier set. For example, as shown in FIG. 6, user identifier 606 of a group-based communication system user, Frank, is rendered along with a plurality of indications of directory user data objects 604 (e.g., external user identifiers), including Francis.

As shown in FIG. 6, and in some embodiments in which the sending user client device is different from the first client device from which the external user directory corpus was received, the user of the sending user client device may view and direct messaging communications to one or more of the directory user data objects associated with the sponsor user identifier of the user of the first client device based on the sending user client device and the external user directory corpus both being associated with the group-based communication workspace identifier and, in some embodiments, the first domain. In other words, Frank, another member of the Acme Corporation workspace, may initiate a directory query and may view and/or direct communications to Adrian's contacts that were ingested into the group-based communication system. In some embodiments, this may allow Frank to quickly locate contact information of one or more colleagues external to the group-based communication system that was previously unknown to the Frank but was known to Adrian.

Returning to FIG. 4A, at operation 406, the group-based communication apparatus 205, such as the processor 202, communications circuitry 208, and/or the like, is configured to receive a messaging communication transmission request associated with an external user identifier from the external user directory corpus. In this regard, in some embodiments, upon the user of the sending user client device selecting an external user (e.g., Adrian selecting Francis) and constructing message data, Adrian may engage with a user interface element associated with generating a messaging communication transmission request. In some embodiments, this user interface element may comprise a button (e.g., a "send" button) indicative of causing the messaging communication to be sent. In some embodiments, the messaging communication transmission request comprises message data that may be generated by, for example, the user at the sending user client device (e.g., Adrian). In this regard, the message data may comprise text (e.g., a message to Francis), emojis, and/or the like. In other words, receival of the messaging communication transmission request may indicate to the group-based communication apparatus 205 that the messaging communication constructed by Adrian is ready for transmission.

In some embodiments, the messaging communication transmission request may be generated in response to user engagement of a direct messaging input interface rendered to a group-based communication interface displayed to the sending user client device. For example, Adrian may desire to construct and send a direct message to Francis of Beta Brands and may engage with a direct messaging input interface rendered at Adrian's device to do so.

In some embodiments, the messaging communication transmission request may be generated in response to user engagement of a messaging communication input interface rendered to a group-based communication interface displayed to the sending user client device. For example, Adrian may desire to construct and send and post a messaging communication to a particular group-based communication channel of Acme Corporation's workspace and may engage with a messaging communication input interface rendered at Adrian's device to do so. In other words, Adrian may desire to post the messaging communication such that the messaging communication is rendered in a message pane configured to display one or more messaging communications of a group-based communication channel in the group-based communication interface rendered to the sending user client device.

In some embodiments, the messaging communication transmission request may be generated in response to user engagement of a calendar messaging input interface rendered to a group-based communication interface displayed to the sending user client device. For example, Adrian may desire to construct and send calendar meeting request or the like and may engage with a calendar messaging input interface rendered at Adrian's device by the group-based communication system.

In some embodiments, the messaging communication transmission request may be generated in response to user engagement of a third-party input interface external to the group-based communication system displayed to the sending user client device, such as external document generation software, ticketing software, and/or the like. For example, Adrian may construct and send a messaging communication transmission request by engaging with an input interface embedded in, for example, a document and/or ticket associated with an external service or software rendered at Adrian's device.

At operation 407, the group-based communication apparatus 205, such as the processor 202, communications circuitry 208, and/or the like, is configured to cause transmission of the message data to an external messaging resource address associated with the external user identifier for rendering by an external messaging resource as a linked message object. In some embodiments, the linked message object may comprise an invite request interface that is configured to, when engaged by a user associated with the external user identifier (e.g., Francis), cause initiation of a new member onboarding protocol associated with the external message resource and the group-based communication workspace identifier (e.g., Acme Corporation).

Figure 7:
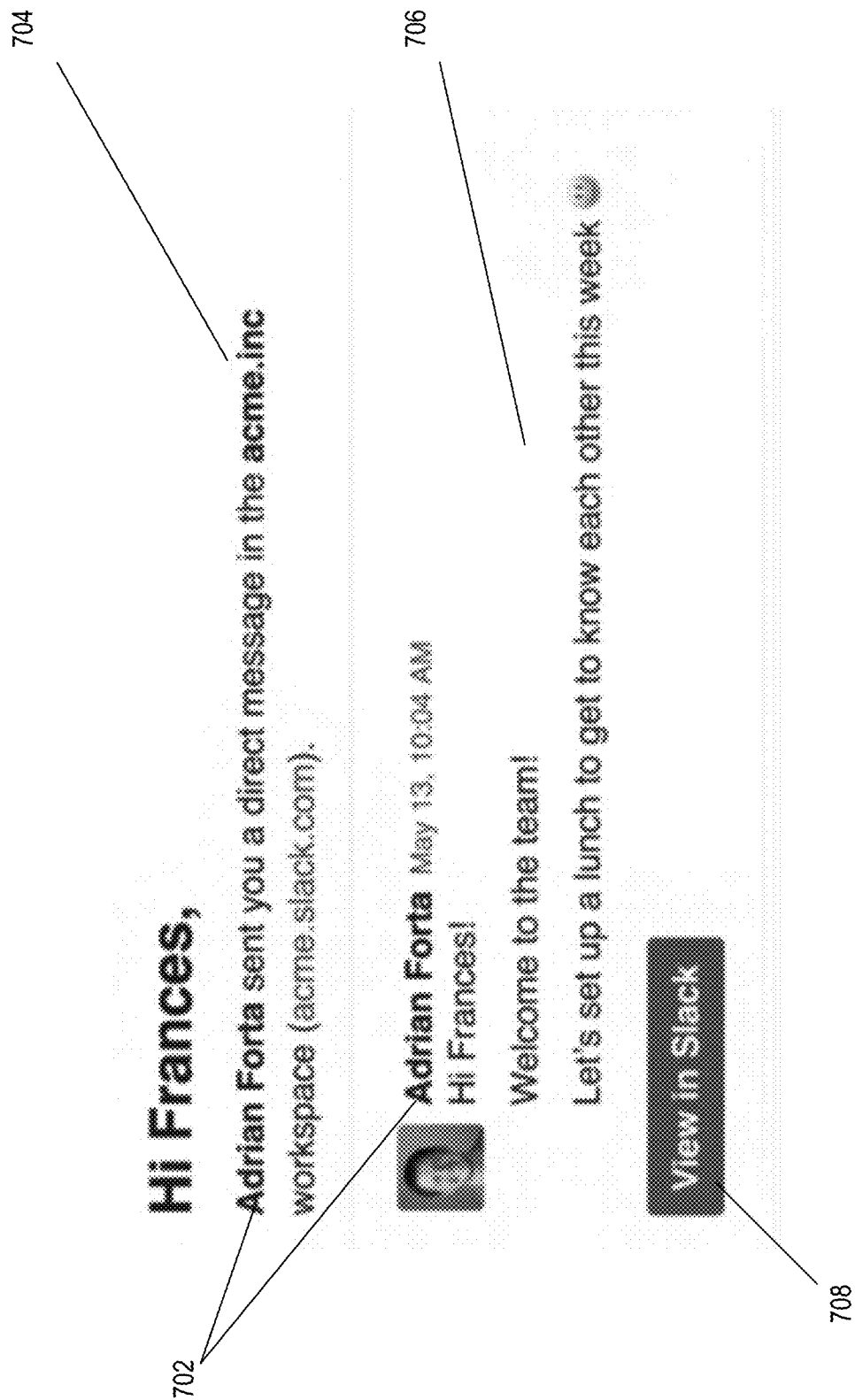
FIG. 7 shows an example linked messaging object rendered by an external messaging resource configured in accordance with one embodiment.

For example, FIG. 7 shows an example linked message object in the form of an email message rendered by an external email resource configured in accordance with one embodiment. As shown in the example rendering of the linked message object, the linked message object may comprise the message data 706 (e.g., Adrian's message to Francis). In some embodiments, the linked message object may also comprise an indication of a sending user identifier (e.g., Adrian's name), an indication of the group-based communication workspace 704 (Acme Corporation's workspace), and an invite request interface 708. Though illustrated as an engageable button, the invite request interface 708 may be in any form of interface element, such as an engageable text hyperlink, engageable image, and/or the like. The invite request interface 708 may be configured to, when engaged by a user associated with the at least one external user identifier (e.g., Frances), cause initiation of a new member onboarding protocol associated with the external message resource and the group-based communication workspace identifier.

Figure 8:
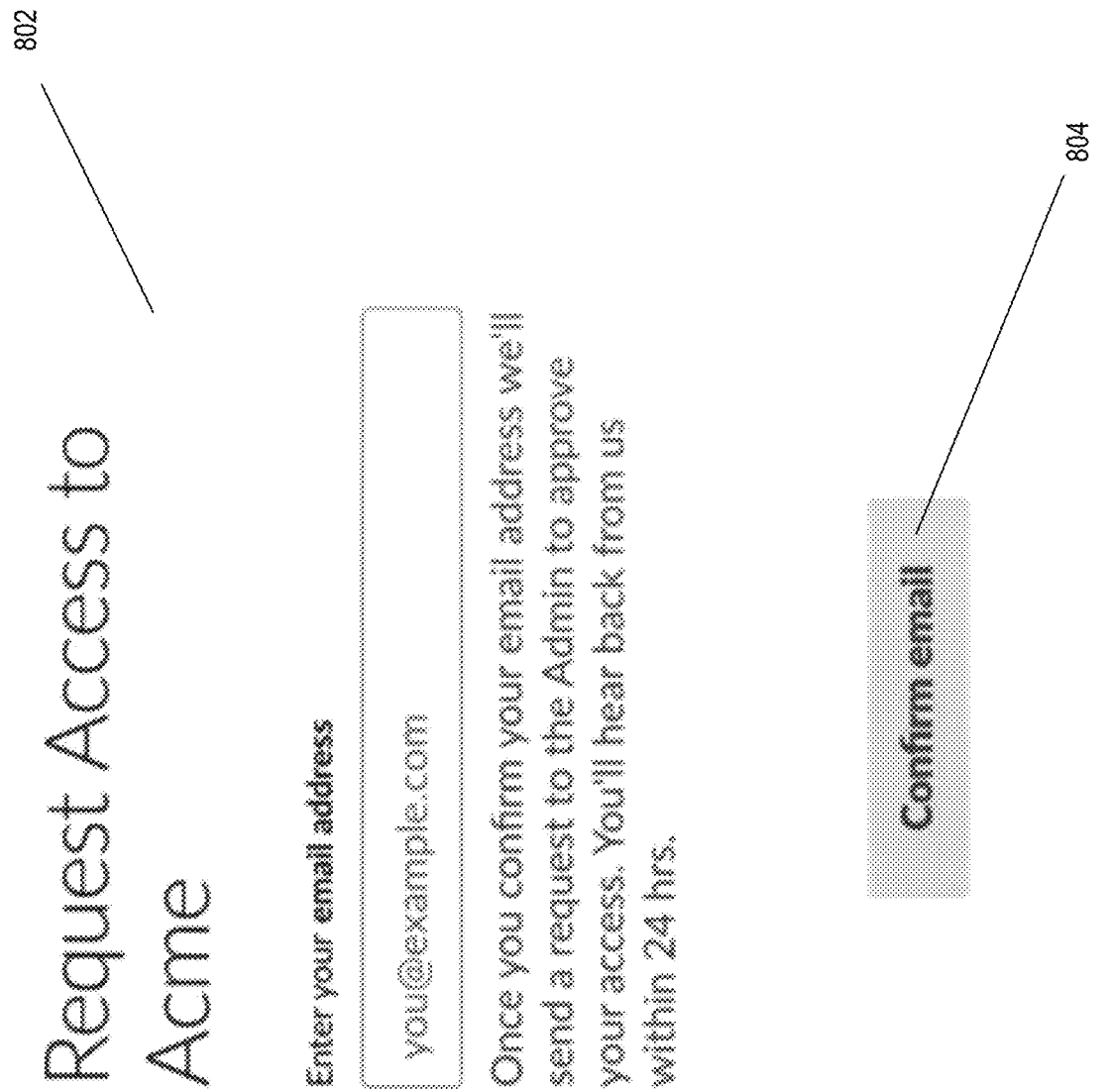
FIG. 8 shows an example invite request interface configured to cause initiation of a new member onboarding protocol configured in accordance with one embodiment.

In some embodiments, engagement of the invite request interface 708 by Francis may further trigger additional rendering of an interface 802 illustrated for example in FIG. 8. Interface 802 may request that Francis confirm their email address by entering their email address into a user interface element (e.g., a text box) and engaging another interface element 804 to proceed.

Figure 4B:
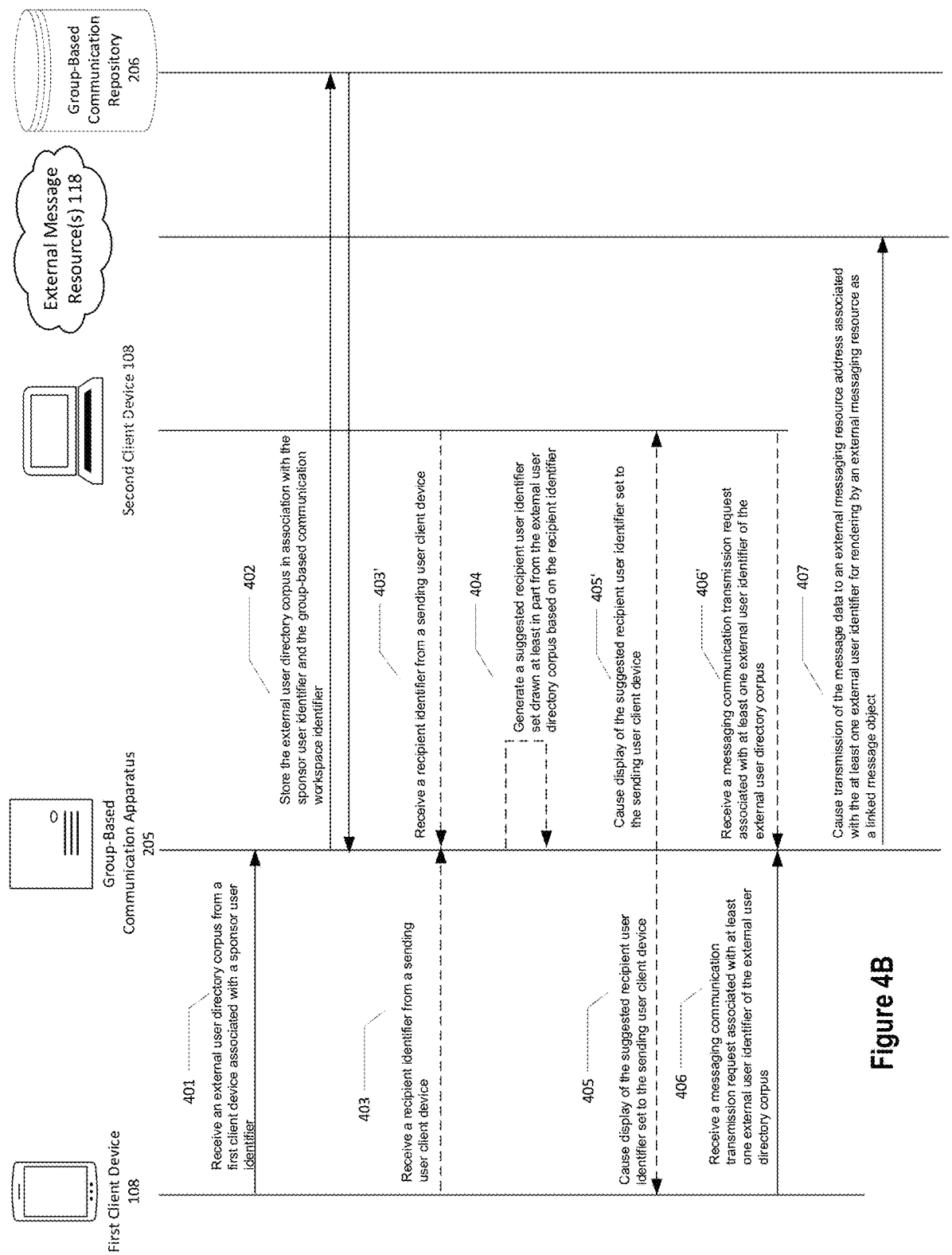
FIG. 4B is a signal diagram of an example data flow for ingesting an external user directory corpus and managing messaging communications involving an external messaging resource in accordance with one embodiment.

FIG. 4B is a signal diagram of an example data flow represented by operations described above and illustrated in FIG. 4A. Method 400 is described as being performed by at least one client device 108 (though in some embodiments may be performed by two or more client devices), a group-based communication apparatus 205, one or more external messaging resources 118, and group-based communication repository 206. These devices may be similar to those previously described above with regards to FIG. 1.

Continuing with the above example, the invite request interface 708 may be configured to, when engaged by a user associated with the at least one external user identifier (e.g., Frances), cause initiation of a new member onboarding protocol associated with the external message resource and the group-based communication workspace identifier.

In some embodiments, the new member onboarding protocol may cause assignment of guest access privileges associated with the external user identifier and the group-based communication workspace identifier. In this regard, the external user (e.g., Francis) may, upon engaging with the invite request interface 708 and initiating the new member onboarding protocol, now may be granted guest access privileges and may be able to interact with the group-based communication workspace in a limited manner. For example, Francis may be able to post messages to a group-based communication channel and direct message channel members but may be unable to create group-based communication channels or workspaces.

In some embodiments, the new member onboarding protocol may cause assignment of full member access privileges associated with the external user identifier and the group-based communication workspace identifier. In this regard, the external user (e.g., Francis) may, upon engaging with the invite request interface 708 and initiating the new member onboarding protocol, now have full member privileges and may be able to interact fully within the group-based communication workspace.

In some embodiments, initiation of the new member onboarding protocol may comprise transmission of an authorization confirmation associated with the invite request interface. Turning to FIG. 5A, at operation 501, the group-based communication apparatus 205, such as the processor 202, communications circuitry 208, and/or the like, is configured to receive an authorization confirmation associated with the invite request interface.

In some embodiments, the authorization confirmation associated with the invite request interface may be received from an external client device associated with the external user identifier (e.g., Francis' device). In some embodiments, the authorization confirmation may comprise the external user identifier, the sponsor user identifier (e.g., Adrian's user identifier), and the group-based communication workspace identifier (e.g., Acme Corporation's workspace identifier). In this regard, the authorization confirmation may be indicative that Francis may desire to join the group-based communication system and workspace and participate in a new member onboarding protocol.

At operation 502, the group-based communication apparatus 205, such as the processor 202, communications circuitry 208, and/or the like, is configured to generate an authorization request based on the authorization confirmation. For example, the authorization request may comprise the at least one external user identifier, the sponsor user identifier, and the group-based communication workspace identifier associated with the authorization confirmation.

At operation 503, the group-based communication apparatus 205, such as the processor 202, communications circuitry 208, and/or the like, is configured to cause transmission of the authorization request to an admin client device associated with the group-based communication workspace identifier. In this regard, an admin user, e.g., Adam, may approve or deny Francis the ability to join the group-based communication workspace.

In some embodiments, as described above, the group-based communication apparatus 205, such as the processor 202, communications circuitry 208, and/or the like, may be configured to cause transmission of the authorization request to an external approval provisioning service 110 for review by one or more admin users. For example, the group-based communication apparatus may interact with the external approval provisioning service via external approval API 115. In some embodiments, one or more admin users of admin client devices 109 may review the authorization request through use of the external approval provisioning service 110. In this regard, Adam may utilize the external approval provisioning service to approve or deny the authorization request received at the external approval provisioning service 110.

However, in some embodiments, the group-based communication apparatus 205 may cause transmission of the authorization request directly to an admin client device 109 associated with the group-based communication workspace identifier (e.g., Adam's device) for approval or denial of the onboarding process associated with the invite request interface.

At operation 504, the group-based communication apparatus 205, such as the processor 202, communications circuitry 208, and/or the like, is configured to receive, in response to the authorization request, an approval indication from the admin client device.

In some embodiments, the approval indication may be generated at the admin client device 109 and transmitted to the group-based communication apparatus 205. In some embodiments, the approval indication may comprise an indication that the one or more admin users who reviewed the authorization interface request associated with the invite request interface (e.g., Adam) approve of Francis joining the group-based communication workspace. In this regard, in some embodiments, the approval indication may indicate admin user approval of the invite request interface.

At operation 505, the group-based communication apparatus 205, such as the processor 202, communications circuitry 208, and/or the like, is configured to update a sharing approval repository to add a sharing approval indication associated with the at least one external user identifier and the group-based communication workspace identifier. As described above, the sharing approval repository may be a table that is configured for storing sharing approval indications correlated to specific user identifiers and/or organization identifiers for each group-based communication resource. In some embodiments, once the sharing approval repository is updated to include the sharing approval indication associated with Francis' external user identifier and Acme Corporation's workspace identifier, the Acme Corporation workspace may be accessible to Francis via his client device.

Figure 5B:
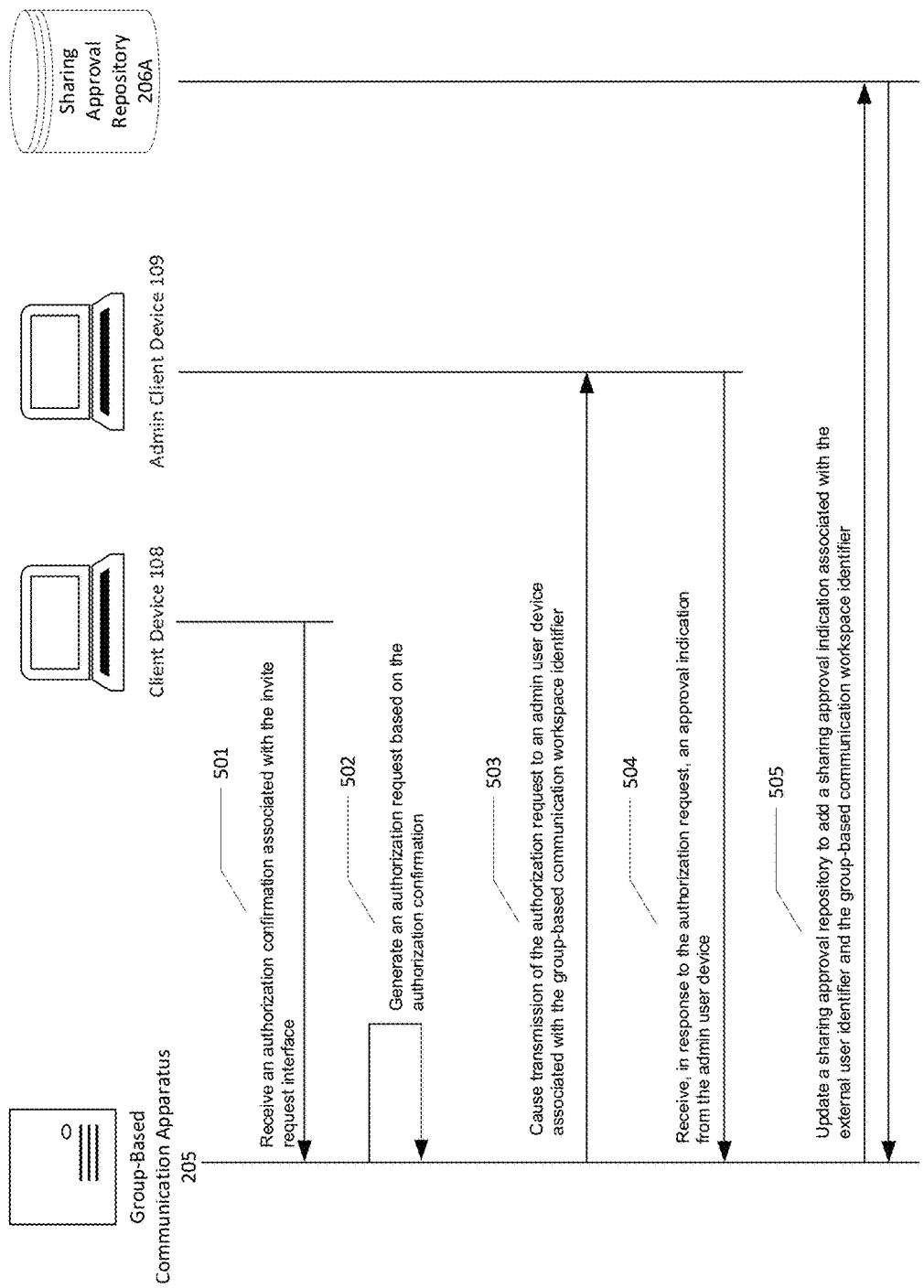
FIG. 5B is a signal diagram of an example data flow for managing a new member onboarding protocol associated with an invite request interface configured in accordance with one embodiment.

FIG. 5B is a signal diagram of an example data flow represented by operations described above and illustrated in FIG. 5A. Method 500 is described as being performed by a client device 108, an admin client device 109, a group-based communication apparatus 205, and sharing approval repository 206A. These devices may be similar to those previously described above with regards to FIG. 1.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

We claim:

1. An apparatus comprising at least one processor and at least one non-transitory memory including program code, the at least one non-transitory memory and the program code configured to, with the at least one processor, cause the apparatus to:
   in response to receiving, from a first client device associated with a sending user identifier, a resource sharing interface request, generate an authorization request based at least in part on the resource sharing interface request, wherein the authorization request comprises a group-based communication resource identifier and a recipient entity identifier;
   cause transmission of the authorization request to an external approval provisioning service;
   receive, in response to the authorization request, a resource sharing response event from the external approval provisioning service;
   in accordance with a determination that an authorization condition is met based on the resource sharing response event, granting access to a group-based communication resource associated with the group-based communication resource identifier for a recipient user associated with the recipient entity identifier based on the resource sharing response event; and
   update a sharing approval repository to add a sharing approval indication associated with the recipient entity identifier and the group-based communication resource identifier based on the resource sharing response event.

2. The apparatus of claim 1, wherein the at least one non-transitory memory and the program code are configured to, with the at least one processor, cause the apparatus to:
   in accordance with a determination that an authorization condition is not met based on the resource sharing response event, deny access to the group-based communication resource associated with the group-based communication resource identifier for the recipient user associated with the recipient entity identifier based on the resource sharing response event, and
   update the sharing approval repository to add a sharing denial indication associated with the recipient entity identifier and the group-based communication resource identifier based on the resource sharing response event.

3. The apparatus of claim 2, wherein the at least one non-transitory memory and the program code are further configured to, with the at least one processor, cause the apparatus to:
   in an instance in which the sharing approval repository is updated to add the sharing denial indication, cause transmission of a denial notification to the first client device, wherein the denial notification is associated with the group-based communication resource identifier and the recipient entity identifier.

4. The apparatus of claim 1, wherein the at least one non-transitory memory and the program code are configured to, with the at least one processor, cause the apparatus to:
   cause transmission of a shared resource invite request to at least one second client device that is associated with the recipient entity identifier; and
   in response to receiving an authorization confirmation associated with the shared resource invite request from the at least one second client device, update the sharing approval repository to add a sharing approval indication associated with the recipient entity identifier and the group-based communication resource identifier.

5. The apparatus of claim 1, wherein the external approval provisioning service is an identity provisioning service.

6. The apparatus of claim 1, wherein the group-based communication resource identifier is associated with a group-based communication channel.

7. The apparatus of claim 1, wherein the group-based communication resource identifier is associated with a group-based communication workspace.

8. The apparatus of claim 1, wherein the group-based communication resource identifier is associated with a group-based communication file.

9. The apparatus of claim 1, wherein the recipient entity identifier comprises a recipient user identifier associated with the recipient user.

10. The apparatus of claim 1, wherein the recipient entity identifier comprises a recipient organization identifier associated with the recipient user.

11. The apparatus of claim 1, wherein the authorization request further comprises:
a request type identifier that corresponds to one of a single resource request, a multi-resource request, a guest access request, or a full member request.

12. The apparatus of claim 1, wherein the at least one non-transitory memory and the program code are further configured to, with the at least one processor, cause the apparatus to:
receive a messaging communication transmission request from the first client device, the messaging communication transmission request comprising message data and an external user identifier selected from an external user directory corpus; and
cause transmission of the message data to an external messaging resource address associated with the external user identifier for display by an external messaging resource as a linked message object.

13. The apparatus of claim 12, wherein the at least one non-transitory memory and the program code are further configured to, with the at least one processor, cause the apparatus to:
prior to receiving the messaging communication transmission request, receive a recipient identifier from the first client device;
query a user directory including the external user directory corpus based on the recipient identifier;
generate a suggested recipient user identifier set drawn at least in part from the external user directory corpus based on the recipient identifier; and
cause display of the suggested recipient user identifier set to the first client device, wherein the messaging communication transmission request further indicates selection of the external user identifier from the suggested recipient user identifier set.

14. A method comprising:
in response to receiving, from a first client device associated with a sending user identifier, a resource sharing interface request, generating an authorization request based at least in part on the resource sharing interface request, wherein the authorization request comprises a group-based communication resource identifier and a recipient entity identifier;
causing transmission of the authorization request to an external approval provisioning service;
receiving, in response to the authorization request, a resource sharing response event from the external approval provisioning service;
in accordance with a determination that an authorization condition is met based on the resource sharing response event, granting access to a group-based communication resource associated with the group-based communication resource identifier for a recipient user associated with the recipient entity identifier based on the resource sharing response event; and
updating a sharing approval repository to add a sharing approval indication associated with the recipient entity identifier and the group-based communication resource identifier based on the resource sharing response event.

15. The method of claim 14, further comprising:
in accordance with a determination that an authorization condition is not met based on the resource sharing response event, denying access to the group-based communication resource associated with the group-based communication resource identifier for the recipient user associated with the recipient entity identifier based on the resource sharing response event, and updating the sharing approval repository to add a sharing denial indication associated with the recipient entity identifier and the group-based communication resource identifier based on the resource sharing response event.

16. The method of claim 15, further comprising:
in an instance in which the sharing approval repository is updated to add the sharing denial indication, causing transmission of a denial notification to the first client device, wherein the denial notification is associated with the group-based communication resource identifier and the recipient entity identifier.

17. The method of claim 14, further comprising:
causing transmission of a shared resource invite request to at least one second client device that is associated with the recipient entity identifier; and
in response to receiving an authorization confirmation associated with the shared resource invite request from the at least one second client device, updating the sharing approval repository to add a sharing approval indication associated with the recipient entity identifier and the group-based communication resource identifier.

18. The method of claim 14, wherein the external approval provisioning service is an identity provisioning service.

19. The method of claim 14, wherein the group-based communication resource identifier is associated with a group-based communication channel.

20. The method of claim 14, wherein the group-based communication resource identifier is associated with a group-based communication workspace.

21. The method of claim 14, wherein the group-based communication resource identifier is associated with a group-based communication file.

22. The method of claim 14, wherein the recipient entity identifier comprises a recipient user identifier associated with the recipient user.

23. The method of claim 14, wherein the recipient entity identifier comprises a recipient organization identifier associated with the recipient user.

24. The method of claim 14, wherein the authorization request further comprises:
a request type identifier that corresponds to one of a single resource request, a multi-resource request, a guest access request, or a full member request.

25. A computer program product comprising at least one non-transitory computer-readable storage medium having computer-readable program code portions stored therein, the computer-readable program code portions comprising an executable portion configured to:
in response to receiving, from a first client device associated with a sending user identifier, a resource sharing interface request, generate an authorization request based at least in part on the resource sharing interface request, wherein the authorization request comprises a group-based communication resource identifier and a recipient entity identifier;
cause transmission of the authorization request to an external approval provisioning service;
receive, in response to the authorization request, a resource sharing response event from the external approval provisioning service;
in accordance with a determination that an authorization condition is met based on the resource sharing response event, grant access to a group-based communication resource associated with the group-based communication resource identifier for a recipient user associated with the recipient entity identifier based on the resource sharing response event; and update a sharing approval repository to add a sharing approval indication associated with the recipient entity identifier and the group-based communication resource identifier based on the resource sharing response event.

\* \* \* \* \*